United States Patent
Sadeddin et al.

(10) Patent No.: US 12,125,037 B1
(45) Date of Patent: Oct. 22, 2024

(54) SECURITY ALERTS IN SUPPLIER TRANSACTIONS

(71) Applicant: COUPA SOFTWARE INCORPORATED, San Mateo, CA (US)

(72) Inventors: Ahmad Sadeddin, San Francisco, CA (US); Rajiv Ramachandran, San Ramon, CA (US); Anju Gupta, San Francisco, CA (US); Christopher Nicholson, San Mateo, CA (US); Angela Welchel, San Lorenzo, CA (US); Rohit Jalisatgi, San Ramon, CA (US); Brent Knott, Sarasota, FL (US)

(73) Assignee: Coupa Software Incorporated, San Mateo, CA (US)

( * ) Notice: Subject to any disclaimer, the term of this patent is extended or adjusted under 35 U.S.C. 154(b) by 191 days.

(21) Appl. No.: 17/566,753

(22) Filed: Dec. 31, 2021

(51) Int. Cl.
G06Q 20/40 (2012.01)

(52) U.S. Cl.
CPC ....... *G06Q 20/4016* (2013.01); *G06Q 20/405* (2013.01); *G06Q 2220/00* (2013.01)

(58) Field of Classification Search
None
See application file for complete search history.

(56) References Cited

U.S. PATENT DOCUMENTS

| | | | | |
|---|---|---|---|---|
| 2009/0150288 A1* | 6/2009 | Bishop | ............... | G06Q 20/40 705/44 |
| 2011/0184868 A1 | 7/2011 | Lacerte et al. | | |
| 2014/0244480 A1 | 8/2014 | Kanjlia et al. | | |
| 2016/0364726 A1* | 12/2016 | Lopez | ............... | G06Q 20/227 |
| 2018/0308090 A1* | 10/2018 | Leavitt | ............... | G06Q 20/40 |
| 2022/0147982 A1* | 5/2022 | Throckmorton | ... | G06Q 20/3827 |

* cited by examiner

*Primary Examiner* — Gregory S Cunningham, II
(74) *Attorney, Agent, or Firm* — Baker Botts L.L.P.

(57) ABSTRACT

In one embodiment, a computer-implemented method comprises, using an e-procurement platform instance that is programmed to host thousands of user accounts that are associated with a plurality of different entities, receiving, from a buyer computer, supplier payment account data for a dataset representing a payment to a supplier; creating a cryptographically secure fingerprint based on the supplier payment account data; using the fingerprint and at least a portion of the supplier payment account data, programmatically transmitting a structured database query to a digital data repository, the digital data repository comprising at least hundreds of thousands of records of transactions that included other datasets representing other payments; in response to the querying, receiving a result set of a plurality of supplier payment datasets, based on the records of transactions, the supplier payment datasets representing past submissions of payments to the same supplier payment account that the fingerprint represents; based on the result set and a plurality of programmatic rules, calculating one or more notification metrics and selecting a notification from among a plurality of programmed notifications and transmitting, to the buyer computer, presentation instructions which when rendered using the buyer computer cause displaying the one or more notification metrics and a notification text.

24 Claims, 11 Drawing Sheets

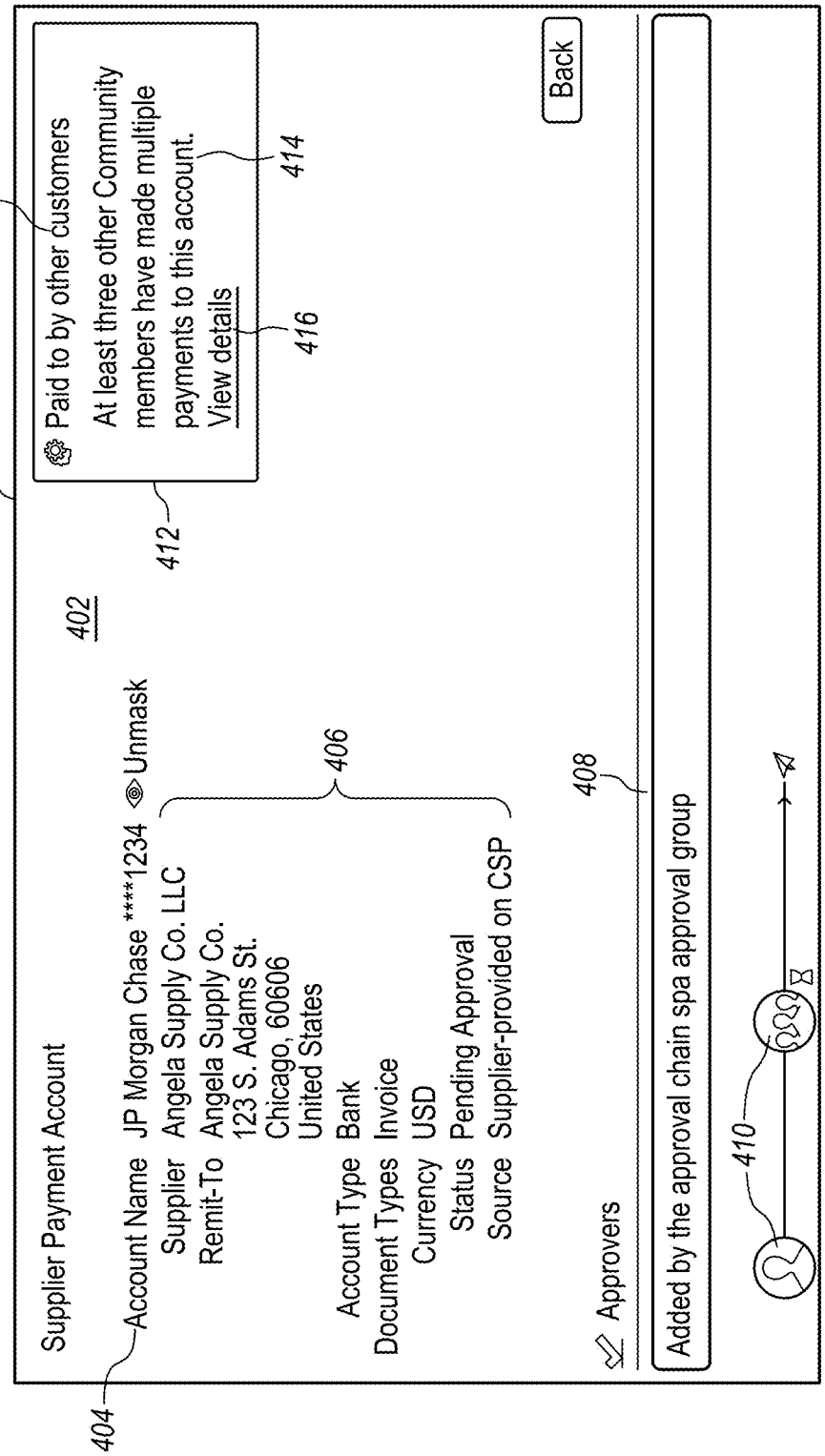

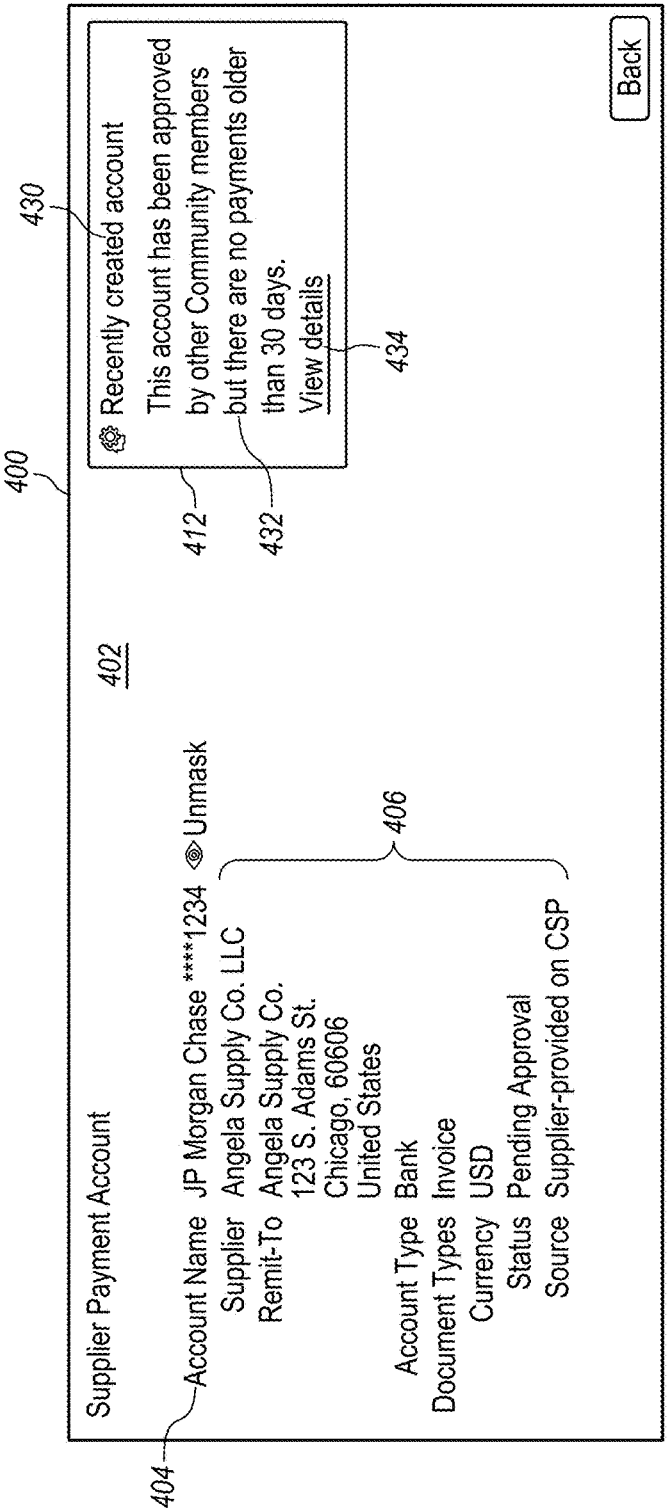

FIG. 4E

- 450 ⚙ Rejected or deactivated by other customers
- 452 At least two other Community members have rejected or deactivated this account.
- 454 View details

FIG. 4F

Supplier Payment Account Details — 460

462 {
- Supplier: Angela Supply Co.
- Account Name: JP Morgan Chase ***1234
- Account Type: Bank
- Remit-To: Angela Supply Co.
  123 S. Adams St.
  Chicago, 60606
  United States
}

* Rejection Reason
- ● The account details are incorrect
- ○ This account has been closed by the supplier
- ○ We no longer use this account
- ○ This account may have fraudulent activity
- ○ Other

463

Cancel    Submit — 464

FIG. 4G

- 470 ⚠ Marked as Fraudulent
- 472 Rudy Okoye has marked this account as fraudulent
- 474 View details

SECURITY ALERTS IN SUPPLIER TRANSACTIONS

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright or rights whatsoever. © 2021 Coupa Software Incorporated.

TECHNICAL FIELD

The present disclosure relates to automatic detection of fraud conditions in procurement transactions and transmission of alert signals concerning fraud conditions.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Online, software-as-a-service, electronic procurement systems have attracted widespread use to initiate, facilitate, and track procurement transactions among enterprises. Computers of enterprise buyers and suppliers each connect via networks to a distributed or cloud-based server computer system that hosts a multi-tenant, multi-instance of an online procurement platform. Buyer computers can search for suppliers, and supplier computers can enter into supply transactions with the buyer computers. Purchase orders, requisitions, invoices, and payment records all are created electronically and managed in the system so that both buyers and suppliers have end-to-end visibility of transactions and the capability to analyze large numbers of transactions over long time periods to identify spending patterns, control spending, identify better suppliers, and improve transactions.

Ultimately the buyer computer must arrange a payment of value to a supplier computer in exchange for goods or services that have been supplied or will be supplied. However, customers fear paying a supplier using bank account details that fraudulently benefit a third party rather than genuinely pay the supplier.

To combat payment fraud arising from incorrect remit-to or pay-to bank account details, customers can scrutinize supplier data, especially bank account information, when agreeing to work with a supplier or "onboarding" the supplier into the customer's instance of the e-procurement platform, and can inspect any change to that information that the supplier or a third party proposes. But this requires time-consuming multi-step processes that require human involvement and can lead to human error. Typically, these processes cannot be completed at the same time that a payment is prepared for processing, when the remit-to account details are at the fingertips of the buyer's representative.

Bank account details, such as routing number, account number, IBAN number, and the like, can be misused by malicious actors. For example, known account details could be used to initiate fraudulent electronic debits or charges. Consequently, users associated with the buyers fear sharing the details of payment accounts with other enterprises, or even within their own enterprise. Financial privacy laws and other security and privacy laws and regulations present a significant obstacle to free-flowing sharing of account details.

Based on the foregoing, there is an unmet need in the relevant fields for a way for buyer computers to obtain better information about past usage and risks associated with accounts to which the buyer computer is preparing to send a payment.

SUMMARY

The appended claims may serve as a summary of the invention.

BRIEF DESCRIPTION OF THE DRAWINGS

In the drawings:

FIG. 4A, FIG. 4B, illustrate examples of computer display devices with portions of a graphical user interface that can be programmed to generate and display alerts concerning account data risk issues.

FIG. 4C illustrates an example of a computer display device with an alternate form of a supplier payment account window.

FIG. 4D, FIG. 4E illustrate further examples of a notification panel.

FIG. 4F illustrates an example computer display device with graphical user interface in which rejection reasons are submitted.

FIG. 4G illustrates a further example of a notification panel.

DETAILED DESCRIPTION

Figure 1A:
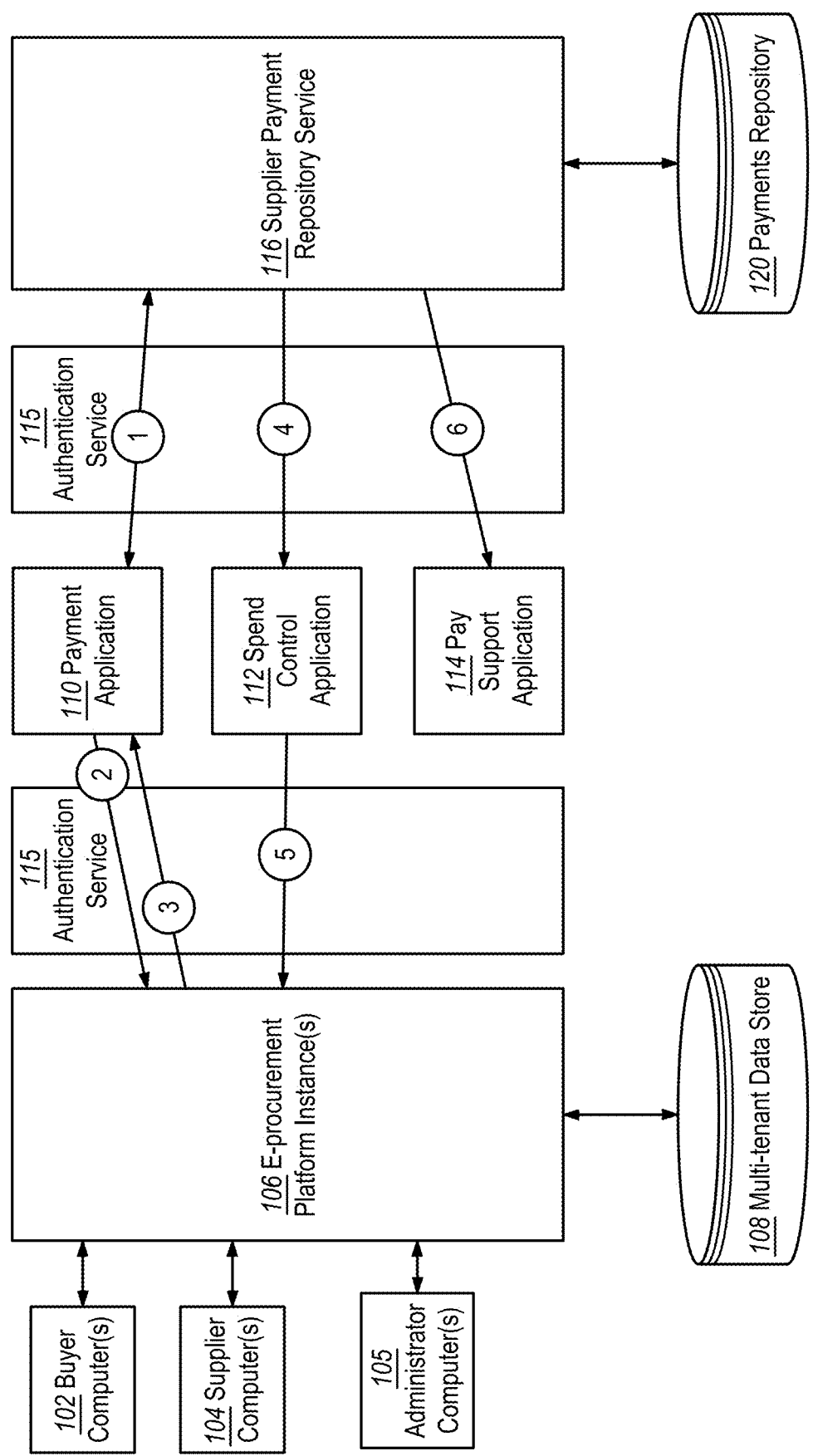
FIG. 1A illustrates a distributed computer system showing the context of use of a supplier payment repository service in relation to other elements of an e-procurement system with which one embodiment could be implemented.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

The text of this disclosure, in combination with the drawing figures, is intended to state in prose the algorithms that are necessary to program a computer to implement the claimed inventions, at the same level of detail that is used by people of skill in the arts to which this disclosure pertains to communicate with one another concerning functions to be programmed, inputs, transformations, outputs and other aspects of programming. That is, the level of detail set forth in this disclosure is the same level of detail that persons of skill in the art normally use to communicate with one another to express algorithms to be programmed or the structure and function of programs to implement the inventions claimed herein.

Embodiments are described in sections below according to the following outline:

1. General Overview
2. Structural & Functional Overview
   2.1 Example Distributed Computer System Implementation
   2.2 Example Risk Notification Process
   2.3 Example Graphical User Interface Implementation
   2.4 Application Programming Interface Example
3. Implementation Example—Hardware Overview 1. General Overview Embodiments provide new ways of securely and safely obtaining intelligence about the use of the payment accounts of suppliers or others in an e-procurement ecosystem, both within an enterprise or computing instance and across a community of other enterprises or instances. At the time of creating a supplier record, participating in an approval chain concerning a planned payment, and/or releasing a payment or batch of payments into the payment networks, a buyer computer or other end-user computer can obtain, either upon request or via programmed, automatic functions of applications with which the computer is interacting, metadata concerning the historic usage and/or risks associated with a particular payment account. Requests and responses can be transmitted, programmatically, in real-time as other operations in applications are underway. Accounts can be identified in a secure manner based upon a cryptographically-based representation of account details, without exposing actual account numbers, for example.

Consequently, a community of unrelated buyer computers can securely obtain alerts, notifications, or other data messages concerning payment accounts on a real-time basis. Recommendations of payment accounts to use can be provided. Fraud alerts or risk values derived from successful payments, failed payments, rejected accounts, or accounts that were affirmatively marked as fraudulent by others can be provided.

Furthermore, with the account storage techniques, requests and responses that are disclosed herein, buyer computers can acquire better visibility concerning who they are paying, how, and the risks that have been identified by others in dealing with the same payment account. For example, buyer computers that have never received the account details for a particular payment account, but have authority to identify a supplier and prepare a payment to the supplier, can receive alerts or other notifications concerning the usage or risks associated with the payment account, without having account numbers or other details at hand.

In an embodiment, in an online, digital electronic e-procurement system, when buyer computers create payment account records in association with supplier records, the system can be programmed to automatically analyze a set of data identifying a bank account, other payment account, or other payment data, determine if the data is recognized based on past experience of the system, and generate one or more alerts or notifications concerning the data. Alerts or notifications can be generated based on result sets from queries of the data in the payments repository and then using a plurality of different programmed heuristics, rules, or tests, or a machine learning classifier to evaluate the result sets. For example, if the data is recognized, then a notification can inform the buyer computer that the account is known, which tends to increase confidence in using the data.

In some embodiments, the system can be programmed to determine whether other buyer computers have previously successfully paid funds to the set of data, whether payments failed, whether fraud alerts from other systems have been received, and conduct other determinations or notifications. More broadly, notifications can express any of a plurality of different risk levels that are associated with the account data. Embodiments can be supported using a digitally stored database that stores records, on a unified basis for all buyer computers that use the system, of all payment accounts that are established using the system; a unified approach enables the system to use community-based intelligence to generate a notification to a first buyer computer based upon an experience of an entirely different second computer that is associated with a different entity. Account data can be encoded, rather than stored directly, to anonymize the data and make the data unusable if the database is compromised.

In an embodiment, records of account data and records of payments are digitally stored in a payments repository. Account data is transformed using a fingerprinting algorithm to enable storing data representative of account data, rather than directly storing account data or payment data, such as account details or details of a payment record or payment transaction. Each fingerprint also normalizes account data and eliminates conflicts in names or abbreviations referring to an institution or account. Payment records can be a complete history of payments made against the accounts that are represented in the payments repository. The account fingerprinting, and the unification or centralization of account data and payment data, facilitates machine analysis of account data and payment data from multiple different, unrelated enterprises that are associated with buyer computers, generating interpretations of the account data and payment data based on a community rather than a single enterprise, and generating notifications or alerts to any entity in the community that may use an account that is represented in the payments repository and was the subject of activity by any other enterprise in the community.

Furthermore, other applications or services of the e-procurement platform can be programmed to programmatically access or query the payments repository. Using programmed calls, other applications or services can pass, to the payments repository or to an interface service, account data that user computers have input to the repository, and receive a fingerprint value representing the account data. Multiple different applications, services, or systems can use the fingerprint value for the purposes of community intelligence, fraud screening or comparisons of other data to identify duplicates. By programmatically acting using fingerprint values, the applications, services, or systems do not handle sensitive account information in an unsecure way.

In one embodiment, a computer-implemented method comprises, using an e-procurement platform instance that is programmed to host thousands of user accounts that are associated with a plurality of different entities, receiving, from a buyer computer, supplier payment account data for a dataset representing a payment to a supplier; creating a cryptographically secure fingerprint based on the supplier payment account data; using the fingerprint and at least a portion of the supplier payment account data, programmatically transmitting a structured database query to a digital data repository, the digital data repository comprising at least hundreds of thousands of records of transactions that included other datasets representing other payments; in response to the querying, receiving a result set of a plurality of supplier payment datasets, based on the records of transactions, the supplier payment datasets representing past submissions of payments to the same supplier payment account that the fingerprint represents; based on the result set and a plurality of programmatic rules, calculating one or more notification metrics and selecting a notification from among a plurality of programmed notifications and transmitting, to the buyer computer, presentation instructions which when rendered using the buyer computer cause displaying the one or more notification metrics and a notification text.

In one feature, the method further comprises executing a particular programmatic rule, the particular programmatic rule being programmed to search the result set and to generate a list of two or more supplier names that are represented in the result set and including the list of supplier names in the presentation instructions. Additionally or alternatively, the method can comprise executing a particular programmatic rule, the particular programmatic rule being programmed to search the result set and to determine that the supplier payment account has been approved by two or more of the user accounts and that none of the past submissions of payments are associated with a payment date value older than a specified period.

Additionally or alternatively, the method can comprise executing a particular programmatic rule, the particular programmatic rule being programmed to search the result set and to determine that more than 65% of the past submissions of payments to the supplier payment account have yielded failed payments. Additionally or alternatively, the method can comprise executing a particular programmatic rule, the particular programmatic rule being programmed to search the result set and to determine that the supplier payment account has been rejected or deactivated by two or more of the user accounts.

Additionally or alternatively, the method can comprise executing a particular programmatic rule, the particular programmatic rule being programmed to search the result set and to a user account of the same entity as the buyer computer has marked the supplier payment account as fraudulent; configuring the e-procurement platform instance to block a submission of a new payment from the buyer computer to the supplier payment account. Additionally or alternatively, the method can comprise determining, by programmatically searching the result set, that one or more other payment accounts are specified in other records of the digital data repository for the supplier, and that one of the entities associated with the buyer computer has not associated any of the other payment accounts with the supplier; in response thereto, generating and causing displaying, in a graphical user interface on the buyer computer, a visual dialog box having a plurality of rows respectively identifying the one or more other payment accounts and comprising a plurality of hyperlinks respectively associated with the plurality of rows; each hyperlink in the plurality of hyperlinks being programmed, when selected, to associate one of the one or more other payment accounts with a virtual card.

In a further feature, the method can comprise calculating the cryptographically secure fingerprint using a one-way SHA-256 hash over a country-specific concatenation of a plurality of elements of the supplier payment account data. The plurality of elements can comprise a country value specifying United States of America, an ABA routing number and bank account number. Or, the elements can be a payment card number, expiration data, CVC value, and/or account name. Or, the elements can be attribute values of a payment record, such as a combination of two or more of pay-to account, payment amount, date, payee, and/or payor.

In a further feature, the records of the digital data repository can be organized using a plurality of relational database tables comprising: a supplier references table being related indirectly to a payments account table; a payments table being related to the payment accounts table; the payments account table being related to a fingerprints table; the fingerprints table being related to a bank accounts table. The fingerprints table can comprise columns that associate the fingerprint value, a randomly or pseudo-randomly generated reference key, and a type of account from which the fingerprint value was created. Additionally or alternatively, the method can comprise, in response to the querying, determining that the fingerprint value does not match a row in the fingerprints table, and in response: creating a new row in the fingerprints table, the new row having a row identifier; storing the row identifier in the payment accounts table in association with customer data identifying one of the entities that is associated with the buyer computer; and storing the fingerprint in the new row of the fingerprints table.

Figure 1B:
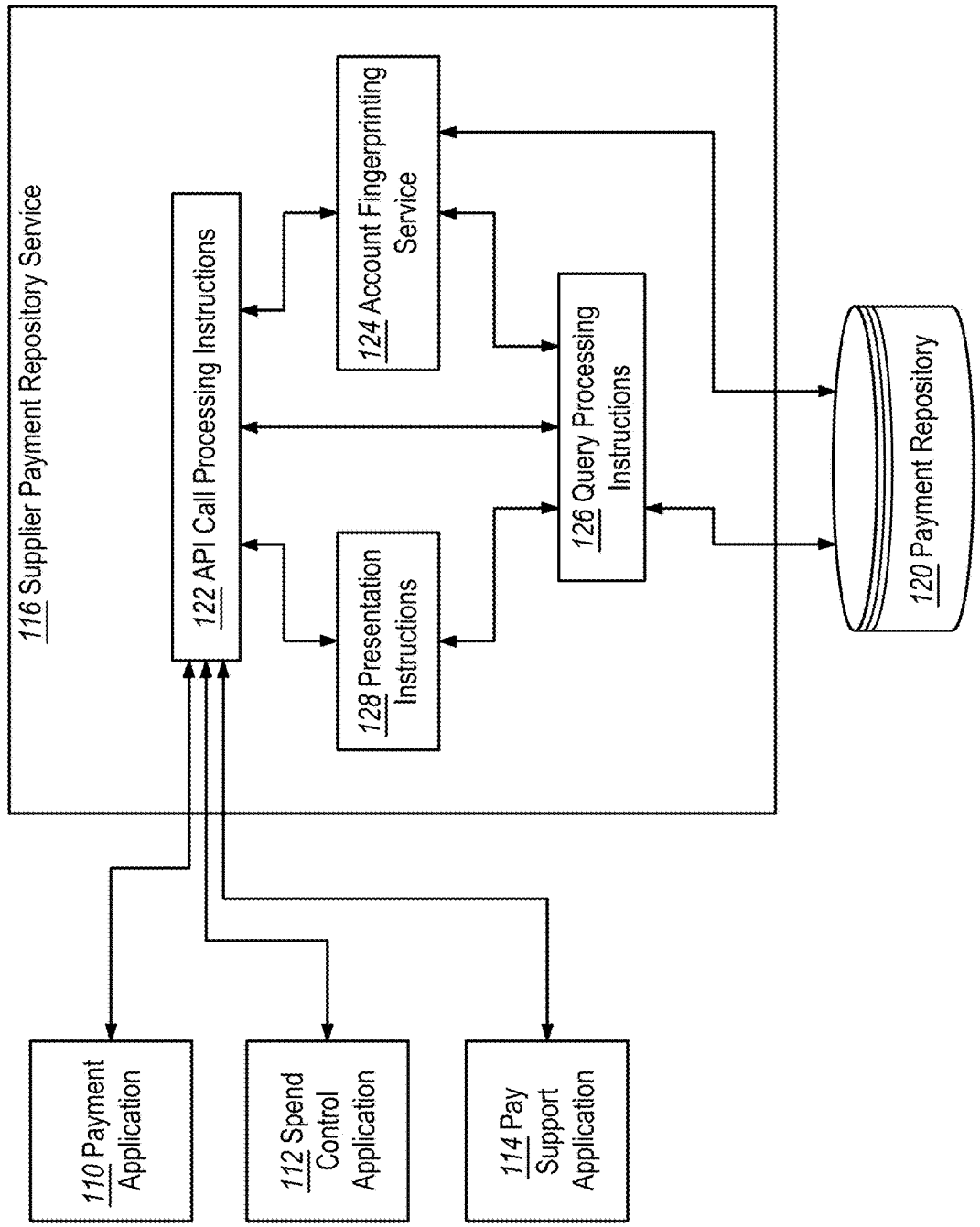
FIG. 1B illustrates a distributed computer system showing the context of use and principal functional elements with which one embodiment could be implemented.

2. Structural & Functional Overview 2.1 Example Distributed Computer System Implementation FIG. 1A illustrates a distributed computer system showing the context of use of a supplier payment repository service in relation to other elements of an e-procurement system with which one embodiment could be implemented. FIG. 1B illustrates a distributed computer system showing the context of use and principal functional elements with which one embodiment could be implemented. The computer systems of FIG. 1A, FIG. 1B, in an embodiment, includes components that are implemented at least partially by hardware at one or more computing devices, such as one or more hardware processors executing stored program instructions stored in one or more memories for performing the functions that are described herein. In other words, all functions described herein are intended to indicate operations that are performed using programming in a special-purpose computer or general-purpose computer, in various embodiments. FIG. 1A, FIG. 1B illustrate only one of many possible arrangements of components configured to execute the programming described herein. Other arrangements may include fewer or different components, and the division of work between the components may vary depending on the arrangement.

FIG. 1A, FIG. 1B, and the other drawing figures and all of the description and claims in this disclosure, are intended to present, disclose and claim a technical system and technical methods in which specially programmed computers, using a special-purpose distributed computer system design, execute functions that have not been available before to provide a practical application of computing technology to the problem of machine learning model development, validation, and deployment. In this manner, the disclosure presents a technical solution to a technical problem, and any interpretation of the disclosure or claims to cover any judicial exception to patent eligibility, such as an abstract idea, mental process, method of organizing human activity or mathematical algorithm, has no support in this disclosure and is erroneous.

FIG. 1A is provided for general context to illustrate one manner of integrating a payments repository into an existing e-procurement system with payment capability. In an embodiment, a plurality of buyer computers 102, supplier computers 104, and administrator computers 105 can be coupled, directly or indirectly via one or more networks, to an e-procurement platform instance 106 that is programmed to host thousands of user accounts that are associated with a plurality of different entities. Each of the buyer computers 102, supplier computers 104, and administrator computers 105 can have the hardware elements of computer system 500, which is described in detail in connection with FIG. 5. Each of the buyer computers 102, supplier computers 104, and administrator computers 105 can be a desktop computer, laptop computer, tablet computer, mobile computing device, smartphone, workstation, or other form of computer with a human-computer interface. The one or more networks, which are not shown for clarity, can be any combination of one or more local area networks (LANs), wide area networks (WAN)s, and internetworks, using any of wired or wireless links, terrestrial, satellite, or microwave links. The networks typically facilitate transportation of datagrams in packetized form between the buyer computers 102, supplier computers 104, administrator computers 105, and e-procurement platform instance using open protocols such as IP, TCP, and HTTP. However, application-specific protocols can be used.

The e-procurement platform instance 106 can be implemented using one or more computers, workstations, computer clusters, and/or virtual computing instances in a private datacenter, public datacenter, or cloud computing facility. E-procurement platform instance 106 can be programmed or organized as multiple applications or services to provide computer-implemented functions such as creating requisitions or purchase orders, creating supply contracts, creating invoices, facilitating payments, arranging sourcing events, conducting data analysis on transaction data, or other applications and services. In one embodiment, the e-procurement platform instance 106 is communicatively coupled to a multi-tenant data store 108, which is programmed to digitally store records of buyer entities, supplier entities, requisitions, purchase orders, invoices, catalogs, and other data to support the applications and services of the platform instance. The e-procurement platform instance 106 can be programmed to accept connections from buyer computers 102 and supplier computers 104 that are conducting transactions concerning a single tenant or enterprise. Or, the e-procurement platform instance 106 can be programmed to deliver applications and services to multiple different, unrelated tenants or enterprises, including direct competitors, by implementing security controls concerning the storing of data in multi-tenant data store 108 and the programmatic transmission of the data among services or applications. Programming techniques and security controls for multi-tenant, SaaS-based applications that serve multiple competitive enterprise customers are well-known at the time of this disclosure and are omitted to ensure clarity of the disclosure.

The e-procurement platform instance 106 can be programmed to interoperate, using calls of application programming interfaces (APIs) through an authentication service 115, with a payment application 110, spend control application 112, and pay support application 114. The same applications can interoperate through the authentication service 115 using other API calls with a supplier payment repository service 116, which is coupled to a payments repository 120. The supplier payment repository service 116 and payments repository 120 are described in further detail herein in other sections. The authentication service 115 can be programmed to receive API calls that applications issue, verify credentials that are carried in the calls, and transmit the calls to a called application or service only after verification.

Thick arrows in FIG. 1A can represent example API calls in which the systems of FIG. 1A interoperate as follows:

API call 1—The payment application 110 sends bank account and payment information to supplier payment repository service 116, which returns an account fingerprint value. In an embodiment, payment information can comprise a plurality of values of supplier payment account data, that is, a dataset representing a payment to a supplier. Example dataset values are a supplier identifier, payment amount, date submitted, and invoice reference. Fingerprint values are discussed in detail in other sections herein.

API call 2—The fingerprint value is included in calls to create a supplier payment account that are conducted between the payment application 110 and the e-procurement platform instances 106. In an embodiment, a supplier payment account comprises values for account name, supplier name, supplier remit-to address, account type, document types, currently, status, and source. An example is further described in other sections herein in connection with FIG. 4A.

API call 3— Request to synchronize payment account status updates to the payment repository 120.

In one embodiment, API calls 1, 2, and 3 are related; for example, whenever a buyer computer 102 accesses the payment application 110 to create a remit-to account or enter other remittance information, the payment application calls the supplier payment repository service 116 in real-time as the buyer computer is interacting with the payment application to generate notifications specifying the number of customer instances that are using the same account, the number of payments that the customer and the community have paid to the account, the dates of the first processed payment and last processed payment, and which user account created the remittance information, if the account previously existed. Other notifications could specify whether the account is in a different country, in a high-risk country, or the subject of suspicious payment patterns such as sudden changes in payment velocity or amounts.

API call 1, 2, 3 also may be associated with payment account creation. For example, the payment application 110 can be programmed to call supplier payment repository service 116 to obtain a fingerprint value to save with a payment account object. Such a call typically is executed after internal validations of the data are complete and optionally after external validations from networked services. Further, call 3 is typically transmitted only after an approval or rejection of the data occurs in a core service of the e-procurement platform instance 106.

Call 2 and call 3 offer the benefit of synchronizing a fingerprint value that resulted from call 1 to other applications of e-procurement platform instance 106, thus making available a consistent fingerprint value for use by other core applications or services in the instance or developed in the future.

API call 4—Get data relating to use of accounts represented by fingerprint values for analysis. Call 4 can be transmitted, in an embodiment, after payment account information is saved in core services of the e-procurement platform instances 106, to populate an initial set of alerts or notifications. Notifications or alerts can be filtered based upon application-specific rules that are programmed in the spend control application 112.

API call 5—Return notifications or alerts that pertain to a specified fingerprint value.

API call 6—Provide a view of existing repository data to a support application for use in support services to others.

One or more of the foregoing calls could be used in response to an approval, rejection, or deactivation of a supplier payment account, to synchronize payment account information to the payments repository 120. In some embodiments, if a rejection action generated via payment application 110 or e-procurement platform instances 106 includes a reason insights association, a reason_code or similar explanation value can be included in a record in the payments repository 120. Notifications or alerts relevant to a supplier payment account approval chain or an assessment by spend control application 112 could include: account has high number of failed payments; account has high number of rejections; account is marked internally as fraudulent. Notifications or alerts that could be relevant to an approval chain for batch payments could include a high number of failed payments or rejections or marked internally as fraudulent.

The foregoing details example calls for example applications. In other embodiments, applications other than payment application 110, spend control application 112, and pay support application 114 may use the supplier payment repository service 116. Further, payment application 110, spend control application 112, and pay support application 114 are not required in any embodiment of the disclosure, but are provided as examples of context or use cases.

Referring now to FIG. 1B, in an embodiment, the supplier payment repository service 116 comprises API call processing instructions 122, account fingerprinting service 124, query processing instructions 126, and presentation instructions 128. Each of the API call processing instructions 122, account fingerprinting service 124, query processing instructions 126, and presentation instructions 128 comprises one or more sequences of stored program instructions that are programmed to execute the functions that are further described in other sections herein. While one embodiment is described in the context of using an API to mediate requests for the supplier payment repository service 116 to act and respond, other embodiments may use other forms of programmatic interfaces, a message bus, or other means of inter-program operation.

In an embodiment, the API call processing instructions 122 can receive input or programmatic calls from payment application 110, spend control application 112, and pay support application 114. In some embodiments, the API call processing instructions 122 could receive input or calls directly from buyer computers 102 or supplier computers 104. The API call processing instructions 122 are programmed to interoperate with account fingerprinting service 124, query processing instructions 126, and presentation instructions 128 to obtain or process account data fingerprint values, retrieve metrics, data values, or metadata relating to fingerprint values from payment repository 120, and to output data, notifications, or results of analytics. The account fingerprinting service 124 is programmed to interoperate with query processing instructions 126 and with the payments repository 120. The query processing instructions 126 interoperate with all other elements of the supplier payment repository service 116; the query processing instructions can be programmed to programmatically transmitting a structured database query to the payment repository 120. The presentation instructions 128 are programmed to receive data from query processing instructions 126 and to interoperate with API call processing instructions 122.

In this manner, a call of any of the payment application 110, spend control application 112, and pay support application 114 is received at API call processing instructions 122, which interprets the call and then calls one or more of the account fingerprinting service 124, query processing instructions 126, and presentation instructions 128 to obtain or process account data fingerprint values, retrieve metrics, data values, or metadata relating to fingerprint values from payment repository 120, and to output data, notifications, or results of analytics. Processing methods and data flows, using the foregoing structural architecture, are further described in other sections herein.

The account fingerprinting service 124 can be programmed to receive bank account details and to generate a fingerprint value and/or related values, such as a reference key value, using encoding techniques that are further described in other sections.

The query processing instructions 126 can be programmed to generate one or more queries to the payment repository 120 to retrieve specific kinds of usage data, counts, metadata, and other values pertaining to the use of bank accounts represented by fingerprint values, and to return result sets to the API call processing instructions 122 and/or presentation instructions 128.

The presentation instructions 128 can be programmed to transform result sets of data from query processing instructions 126, according to programmed rules that are further described, into notification messages, alert messages, or other responses that the payment application 110, spend control application 112, and pay support application 114 can render, display, or otherwise consume.

Payment repository 120 can comprise a relational database, object database, or other high-speed, large-capacity database system. In an embodiment, payment repository 120 is a digital data repository comprising at least hundreds of thousands of records of transactions that include datasets representing payments. The transactions can be any transactions that flow through the e-procurement platform instance 106. In an embodiment, payment repository 120 can be implemented using a micro-service or a micro-service interface, using multiple instances of the repository. The table schema of FIG. 2, discussed next, can be used. In some embodiments, payment repository 120 is configured using database servers, storage devices, and other functional elements that are capable of storing hundreds of thousands to millions of payment records that are received in real-time from thousands of enterprises having a customer relationship to the service 116 and/or the e-procurement platform instance 106.

Figure 2:
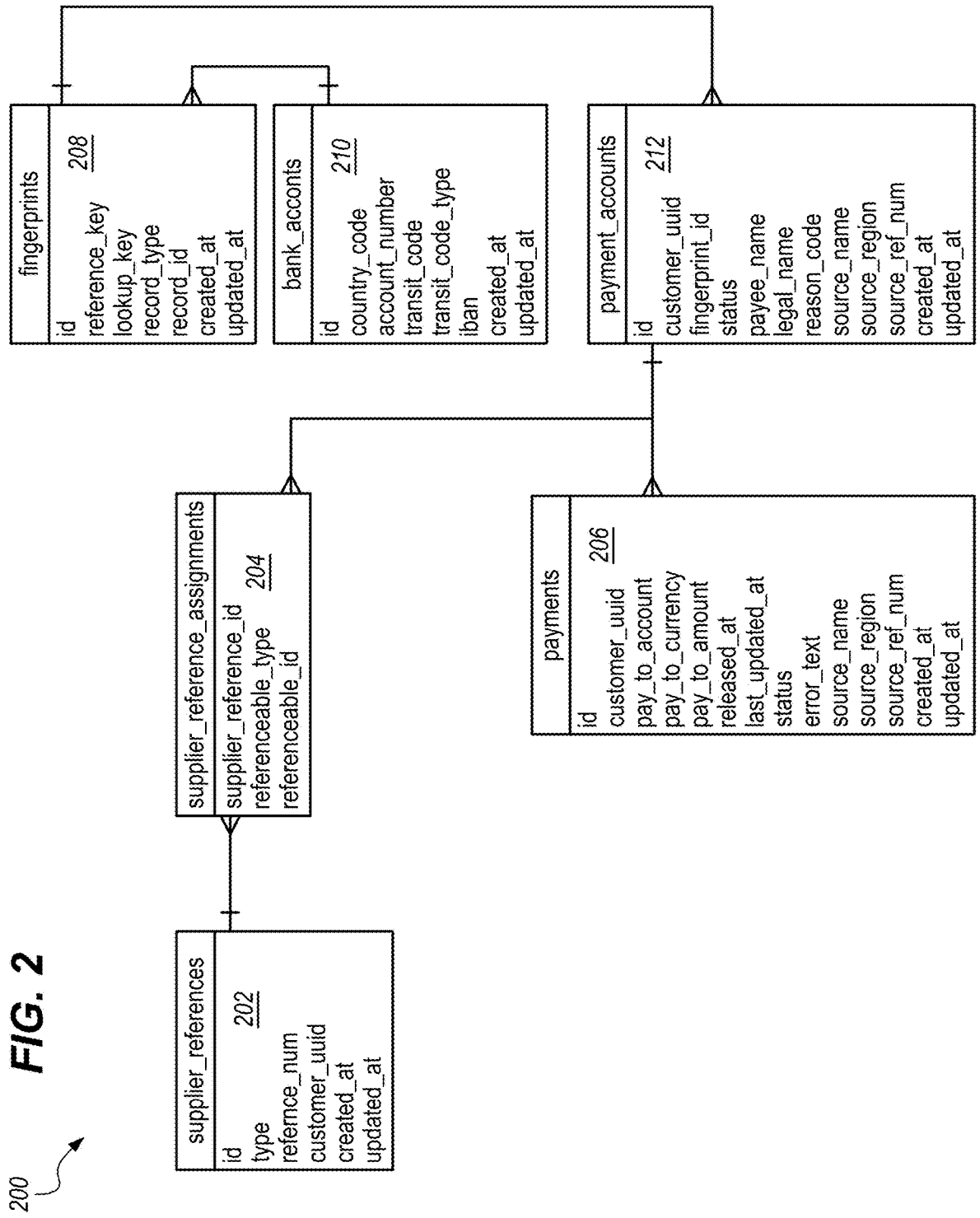
FIG. 2 illustrates a database table schema that can be used in one implementation.

FIG. 2 illustrates a database table schema that can be used in one implementation. While FIG. 2 is provided to clearly illustrate a workable example, other embodiments may use schemas that are not identical to FIG. 2 and the appended claims are not limited to the schema of FIG. 2. In an embodiment, a database table schema 200 can be programmed to include a supplier_references table 202, supplier_reference_assignments table 204, payments table 206, fingerprints table 208, bank_accounts table 210, and payments_account table 212. Labels such as "supplier_references" have been coined for convenience but are not required, in the identical form, in all embodiments. Each of the tables 202, 204, 206, 208, 212 can be programmed in a relational database management system using any of SQL-based or no-SQL methodology. With the schema of FIG. 2, a fingerprint value for a particular account can be positively tied to sources or data points that introduced the fingerprint value, and therefore the underlying account data, into the payments repository 120.

In an embodiment, supplier_references table 202 comprises rows representing references to suppliers and can support functions such as recommendations of suppliers or others that depend upon storing normalized data for suppliers; payments data can support decisions about whether two different records represent the same supplier. Each row has columns or attributes for an identifier (id), type of supplier (type), reference number (reference_num), optionally a customer identifier (customer_uuid), and date or timestamp values such as created_at and updated_at. Rows in supplier_references table 202 can include identifiers that refer to detailed supplier data in other tables, which are omitted for clarity. The customer identifier (customer_uuid) column is optional but can allow for supplier references to each customer instance, if needed; further, by using an identifier rather than a literal string for customer, customer names are masked to prevent unnecessary communication of actual customer names between systems. When the techniques herein are programmed as a service that can be called from other applications—that is, a "global service" of the e-procurement platform instance 106—then to prevent leakage of sensitive data, customer-identifiable data is not stored in supplier_references table 202 and the customer identifier can serve as an anonymized reference. Furthermore, the use of an identifier (id) for a supplier in the supplier_references table 202 enables the schema 200 to support the initial creation of supplier data in the payments repository 120 before that data exists anywhere else in the e-procurement platform instance 106.

The identifier column of supplier_references table 202 can be a key value for supplier_reference_assignments table 204, which also has columns for a type and identifier that are capable of referencing (referenceable_type and referenceable_id). [[Need more description of how these attributes are used.]] The referenceable fields can be polymorphic to directly associate supplier references with bank accounts or other models if needed.

Each payment transaction that is initiated, approved, queued, or otherwise processed in the e-procurement platform instance 106 can be represented as a row in the payments table 206. The payments table 206 enables recording, tracking, and counting numbers of payments, and the results of payment attempts, to the payment accounts tracked in the payment_accounts table 212, for different purposes or in different applications of the same customer or different customers over time. Thus, multiple instances of payments to the same payment account of a particular customer are captured in records of the payments table 206, and enable calculation of metrics concerning numbers of payments to the underlying bank accounts represented in bank_accounts table 210, to which the payment_accounts table 212 is linked, for multiple customers over time.

In an embodiment, rows in the payments table 206 comprise columns for an identifier of the row (id), identifier of the customer making the payment (customer_uuid), timestamp or date fields concerning the row such as created_at and updated_at, and details concerning the payment. Example columns for payment details include an identifier of the account that was paid or is to be paid (pay_to_account), currency of the payment (pay_to_currency), amount of the payment (pay_to_amount), date at which the payment was initiated or transmitted into banking networks or card networks (released_at), timestamp for any update received from the banking networks or card networks (last_updated_at), status of the payment (status), error value received from the banking networks or card networks (error_text), and source of data (source_name, source_region, source_ref_num). Source, in this context, can refer to a system such as payment application 110, spend control application 112. In an embodiment, the identifier of the account that was paid (pay_to_account) can be encrypted or encoded; in some embodiments, the payments table 206 is implemented in memory so that account identifying data is never committed to database storage or disk storage but only processed programmatically in response to calls from other programs or services. The pay_to_account value may indirectly identify a beneficiary, but can contribute to a record in the payment_accounts table 212 with concurrent data from the supplier_references table.

In an embodiment, fingerprints table 208 comprises columns to store an identifier of each row (id), an shareable fingerprint value (reference_key), a cryptographically-based fingerprint value to facilitate rapid lookup operations or query responses (lookup_key), a type of account data represented in a fingerprint (record_type) such as bank, card, or other payment rails or endpoints, an identifier of a source record (record_id), and metadata for each row such as timestamp values for creation date and last update (created_at, updated_at).

In an embodiment, each fingerprint value is a cryptographically secure fingerprint based on the supplier payment account data. For example, the lookup_key of FIG. 2 can be a hash value that has been computed using a one-way hash algorithm over the data shown in bank_accounts table 210. Data in the bank_accounts table 210 is stored securely using encryption techniques but is usually private or highly confidential and therefore not suitable as the direct subject of queries or searches. Therefore, the lookup_key value is used internally for lookups and comparisons. In an embodiment, bank account details in bank_accounts table 210 are stored in an encrypted format; therefore, individual values cannot be easily queried for comparison to input from other systems.

The lookup_key value may comprise a secure one-way hash over the key fields for each account. In an embodiment, the fingerprint value is based upon a combination of values in the raw account data that varies according to country of origin. For example, for US-based accounts, the fingerprint value is based upon a concatenation of American Bankers Association (ABA) routing number and account number; for UK-based accounts, the basis may be account number and sort code; for German accounts, the basis may be IBAN. In one embodiment, for non-IBAN countries, the basis of calculating the fingerprint value is: version prefix+country code+account number+routing number; for IBAN countries, the basis is: version prefix+country code+IBAN code. The order of concatenating these values, before generating the fingerprint from them, can vary in different embodiments and the order(s) specified above are not required.

Figure 3A:
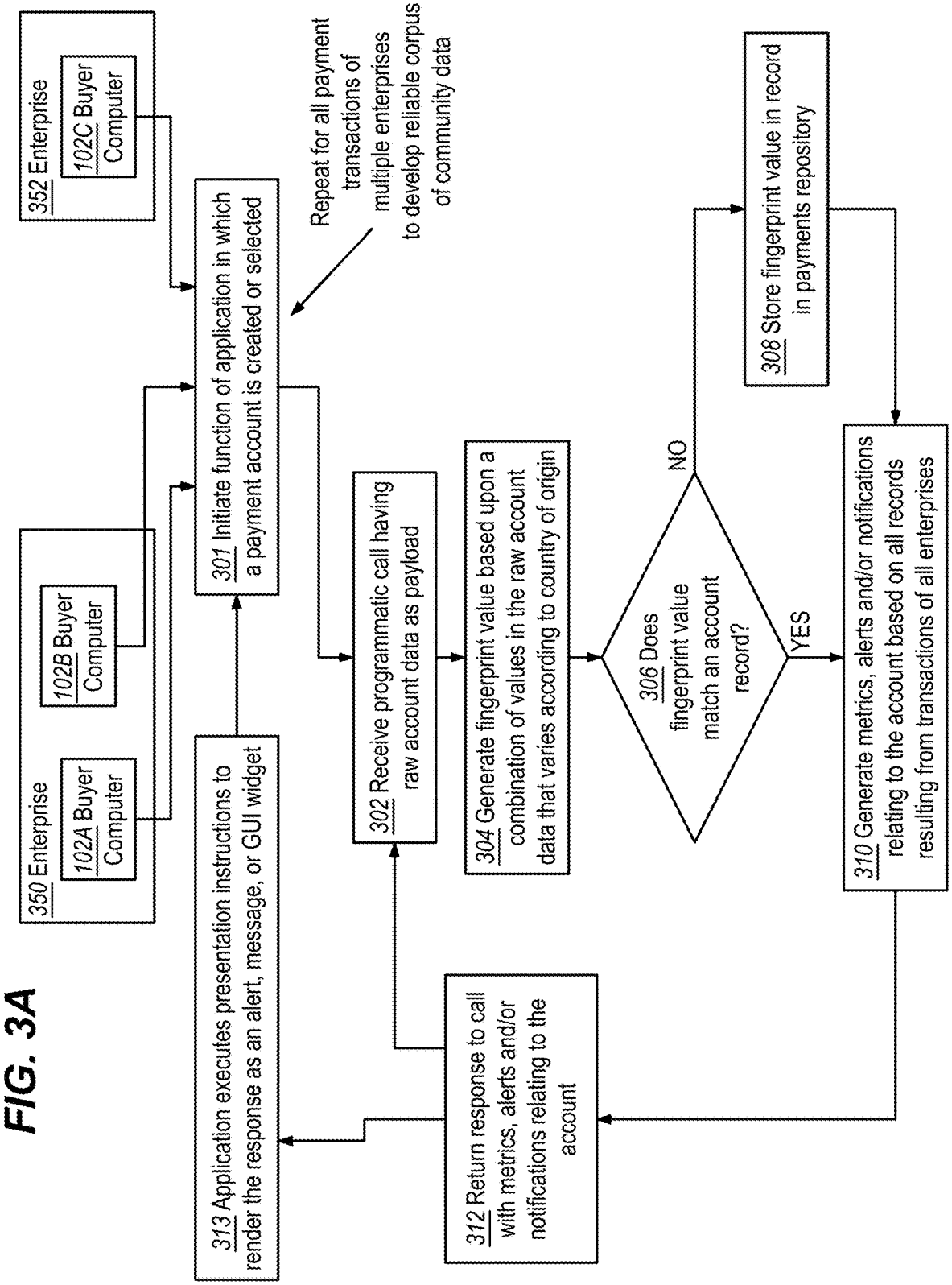
FIG. 3A illustrates an example process of generating risk notifications pertaining to payment account data.

When an incoming request with new bank account details is received, the same hash algorithm can be applied to that data, then compared with lookup_key values or used in a query; FIG. 3A, described in other sections, provides an example. In an embodiment, the hash algorithm is selected to provide high collision resistance so that two different combinations of values have an extremely low likelihood of yielding the same fingerprint value. Further, a secret key applicable to the hash algorithm should be stored in a different system and not in the payments repository 120. In an embodiment, the hash algorithm is SHA-256 HMAC. When the payments repository 120 is implemented as a micro-service having multiple instances, a secret key for each repository instance can be generated separately and stored in an external key store. An example key store, applicable to using AMAZON WEB SERVICES as a cloud-based host for application servers that execute the functions herein, is AMAZON WEB SERVICES SECRETS MANAGER.

While the lookup_key value is a secure hash, it is generated using sensitive data, and could be subject to a brute-force attack to expose the base data, so exposing the lookup_key value to external systems is avoided. Instead, the reference_key value can be shared with external systems. In an embodiment, the reference_key value is a pseudo-random or truly random nonce value that can be shared with external systems and can serve as a globally unique identifier for a bank account. This approach also enables internally updating, over time, the algorithm used to generate the lookup_key value, without affecting external systems. Further, the lookup_key value ensures that comparisons or matches of account data are accurate, while the reference_key permits sharing a handle or label for an account without risk of comprising underlying account details.

The fingerprint value is not based on identifiable customer data and such data does not need to be stored. Consequently, the payments repository can store fingerprint values for any account and received from any system that calls the process flow; the payments repository is "global", in this sense, with respect to all other systems with which it interacts. Fingerprint generation with the process herein provides a way to uniquely identify a combination of key bank account fields so that other programmed systems can determine if records sourced from different systems refer to the same bank account. Further, the process generates a non-sensitive reference number that external systems can store, to reference a bank account without having to store or expose more sensitive account details.

Fingerprints table 208 can have a polymorphic record association to the bank_accounts table 210 and payment_accounts 212 to allow for other models to be fingerprinted in the future; models may have multiple versions of fingerprints. Thus, while FIG. 2 shows fingerprints table 208 linked to bank_accounts table 210, a fingerprint could be calculated over attributes other than bank account details.

In an embodiment, the bank_accounts table 210 is programmed to securely store, using encryption, all values necessary to fully identify a bank account in the systems of the United States of America or non-USA banking networks. Rows may comprise column values for an identifier of the row (id), a country or nation in which the account is maintained (country_code), account number, transit code, transit code type, international bank account number (IBAN), and metadata for each row such as timestamp values for creation date and last update (created_at, updated_at). For any specific actual bank account, the bank_accounts table 210 may have excess attributes that do not apply to the account; for example, USA-based accounts do not have an IBAN. Thus, the bank_accounts table 210 is structured to have all columns or attributes needed to represent any account, and some values could be null.

In an embodiment, payments_account table 212 can store key customer-specific supplier data or payment data, to support pay-from and pay-to accounts on payments. The payment_accounts table 212 supports the use of the same account, as represented in a record of bank_accounts table 210, for different purposes or in different applications of the same customer. Thus, one particular bank account could be reused as a payment account multiple times for different applications or other customer uses, and those payment account instances are captured in records of the payments_account table 212. Further, the payments_account table 212 provides a basis for calculating counts of usages of the same bank account by multiple customers over time. In an embodiment, payments_account table 212 comprises columns for an identifier (id) of each row, a customer identifier (customer_uuid), a fingerprint value (fingerprint_id), a status value, a payee name, a legal name of a payee such as a corporation or LLC name, a reason code, source of data (source_name, source_region, source_ref_num) and metadata for each row such as timestamp values for creation date and last update (created_at, updated_at).

For purposes of illustrating a clear example, certain sections herein have described specific ways of computing fingerprint values. Other embodiments may compute a fingerprint value in different ways, using fewer or more of the base values that have been specified, or using different values as a basis of calculation.

Furthermore, for purposes of illustrating a clear example, certain sections herein have described specific ways of calculating values, metrics, and analytics in relation to bank account data. However, other embodiments can operate in connection with data describing accounts other than bank accounts, such as card payment accounts, and can be used to detect and report analytics about possible card use fraud or card payment fraud. Or, an embodiment can operate using data describing payment transactions, payment records, or other aspects of payments, and can be used to detect and report analytics about possible payment fraud.

2.2 Example Risk Notification Process

FIG. 3A illustrates an example process of generating risk notifications pertaining to payment account data. FIG. 3A and each other flow diagram herein is intended as an illustration at the functional level at which skilled persons, in the art to which this disclosure pertains, communicate with one another to describe and implement algorithms using programming. The flow diagrams are not intended to illustrate every instruction, method object or sub-step that would be needed to program every aspect of a working program, but are provided at the same functional level of illustration that is normally used at the high level of skill in this art to communicate the basis of developing working programs.

In an embodiment, a programmed process flow is executed in the context of two or more enterprises 350, 352, with the first enterprise 350 having buyer computers 102A, 102B, and the second enterprise 352 having buyer computer 102C. The label "buyer computer" can be used for one embodiment but other embodiments may use supplier computers or third-party computers for other processes or applications. In FIG. 3A, as with all drawing figures in the disclosure, one or two elements such as the computers are intended to represent any number of similar elements in a practical embodiment, and embodiments may interoperate with thousands to millions of buyer computers or other computers if the e-procurement platform instance(s) 106 have sufficient CPU power, processors, or virtual computing instances. Enterprises 350, 352 may be related, or may be unrelated. They may be competitors.

The process of FIG. 3A begins execution at block 301 when one of the buyer computers 102A, 102B, 102C initiates a function of an application in which a payment account is created or selected. For example, one of the buyer computers 102A, 102B, 102C could execute payment application 110 to create a new supplier record, to queue a batch payment, or to approve a payment. Or, the payment application 110 could execute a function to add a remit-to account and can be programmed to call the payment repository service 116 as part of that function. In an embodiment, initiating the function at block 301 causes the application to transmit a programmatic call to the supplier payment repository service 116, for example, to API call processing instructions 122.

At block 302 the process is programmed to receive the call, often having raw account data as a payload. For example, a "create supplier payment account" function of the payment application 110 could prompt the buyer computer 102A to enter account details for a new supplier remittance account, and the account details would be carried through programmatically to block 302. The flow of block 302 to 312 can be implemented as an asynchronous service, microservice, API call, server, or other function that other systems, programs, or services can call using programmatic calls, parameterized HTTP, or application-specific protocol calls. In one embodiment, the raw account data is for a bank account. In another embodiment, the raw account data is for a payment card and block 302 and other aspects of flow 300 can be programmed to comply with PCI or other card data security protocols.

At block 304, the process is programmed to generate a fingerprint value. For convenience, this disclosure uses the term "fingerprint" to refer to a digital data value that represents elements of a bank account or payment account. However, other terms can be used in other embodiments, provided that they are implemented with the attributes and functions of this disclosure and not in a solely conventional manner; the value can be termed a token, identifier, label, hash, index, representation, or code.

The fingerprint value of block 304 can be generated in the manner described elsewhere herein for lookup_key values in the tables of FIG. 2. At block 306, the process is programmed to test whether the fingerprint value of block 304 matches an existing account record. Block 306 may involve, as sub steps, forming and submitting one or more queries to records in a payments repository. For example, payments repository 120 (FIG. 1A) can be used. In response to the querying, the process can be programmed for receiving a result set of a plurality of supplier payment datasets, based on the records of transactions, the supplier payment datasets representing past submissions of payments to the same supplier payment account that the fingerprint represents. A result set of records from the one or more queries can be tested to determine whether a fingerprint attribute in each record matches the fingerprint that was generated in block 304. If not, then the fingerprint value of block 304 is digitally stored in a new record in the payments repository, at block 308. Control then transfers to block 310, either after block 308, or if the test of block 304 is positive or TRUE.

At block 310, the process is programmed to generate one or more metrics, alerts, and/or notifications relating to the matching account record based on all records resulting from transactions of all enterprises that use the platform. Examples of programmatic rules to implement generating relevant metrics, and specific alerts and notifications, are described further in other sections.

At block 312, the process is programmed to return a response to the call of block 302 with the one or more metrics, alerts, and/or notifications relating to the account. Example forms of responses to calls are provided in other sections herein. At block 313, after the response is returned, the application for which a function was initiated at block 301 executes presentation instructions to render the response as an alert, message, or GUI widget. Example forms of visual presentation, in GUI panels and windows, are provided in other sections herein. Thus, based on the result set and a plurality of programmatic rules, the process is programmed for calculating one or more notification metrics and selecting a notification from among a plurality of programmed notifications and transmitting, to the buyer computer, presentation instructions which when rendered using the buyer computer cause displaying the one or more notification metrics and a notification text.

The flow of FIG. 3A can be programmed to repeat for all payment transactions of multiple enterprises to develop a reliable corpus of community data. That is, if the e-procurement platform instance 106 processes a large number of payment transactions or payment-related functions involving the buyer computers 102 and supplier computers 104, and the supplier payment repository service 116 is programmed to capture details concerning the creation of supplier payment accounts, submission of payments to those accounts, and the results of attempted payments including successes and failures or errors, then the payments repository 120 can accumulate a large number of records in the tables of FIG. 2 as a source of community intelligence concerning payments by multiple different customers, entities, or enterprises. The accumulated data, using the programmatic rules described in other sections, can facilitate generating notifications that are not limited to one entity but encompass the use of payment accounts by multiple different, even competing, entities.

The flow of FIG. 3A can be programmed to supply a real-time response to the buyer computer. As an example, the flow of block 302 to block 312 can be programmed, using high-speed, large-scale databases and implementations in fast machine code, to complete execution within one second, even when the payments repository 120 stores hundreds of thousands to millions of records. "Real-time," in this context, means completion within the time that the buyer computer 102A, 102B can reasonably wait for the response of block 312 after initiating the creation or selection of a payment account and this time can be in the range of one to four seconds. While all functional steps of this disclosure are intended to cover machine execution, it will be apparent that executing a process of this kind with a repository of hundreds of thousands to millions of records would be incapable of manual performance.

Figure 3B:
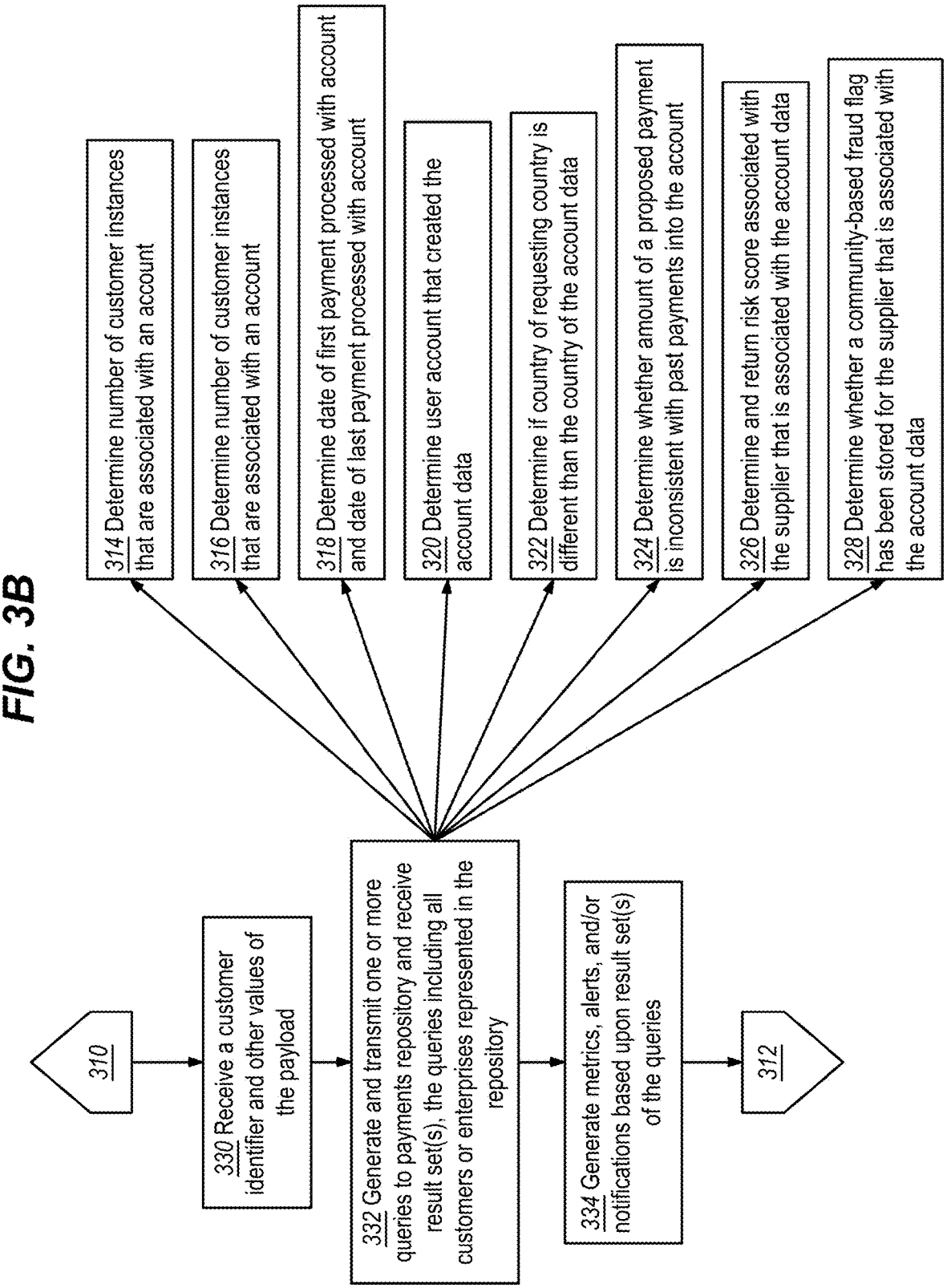
FIG. 3B illustrates a flow diagram of a process of responding to service calls concerning account data.

FIG. 3B illustrates a flow diagram of a process of responding to service calls concerning account data. FIG. 3B can represent sub steps of block 310 of FIG. 3A, in one embodiment.

At block 330, the process receives a customer identifier and other values in a payload of a request or call. For example, the payment repository service 116 receives an API call, which includes a customer ID in the API call payload. An API or other service could be called with a customer_uuid value in the payload or in a call attribute and other sections of this description provide other examples of calls that could occur.

In response, at block 332, the process is programmed to transmit one or more queries to the payments repository and receive result set(s) of records, the queries being for all customers or enterprises that are represented in the repository. In one embodiment, payments older than one (1) month and not older than eighteen (18) months are included in queries. The format, key values, and target tables of queries at block 332 can vary according to the requirements of the call that was received. An example includes a query to the payment accounts table 212 of FIG. 2, using the customer identifier and fingerprint value as keys, to return, as a result set, all records in the table that match those values. Other queries could be formatted to use other key values, such as fingerprint value, to select other records, and to apply programmed rules to result sets before returning a response value, as specified in block 314, block 316, block 318, block 320, block 322, block 324, block 326, block 328. Specific examples include:

Block 314—Determine the number of customer instances that are associated with a specified account.

Block 316—Determine the number of customer instances that are associated with an account.

Block 318—Determine date of first payment processed with account and date of last payment processed with account.

Block 320—Determine user account that created the account data.

Block 322—Determine if the country specified in a request is different than the country of the account data. This rule would trigger, for example, for a customer based in the United States seeking to pay an account located in Germany.

Block 324—Determine whether the amount of a proposed payment is inconsistent with past payments into the account. This query may be programmed using a relative magnitude value or percentage difference value; for example, the query could be programmed to trigger if a proposed payment is more than 100% greater than the mean of prior payments.

Block 326—Determine and return a risk score that is associated with the supplier corresponding to the account data.

Block 328—Determine whether a community-based fraud flag has been stored for the supplier that is associated with the account data. In an embodiment, any user account can propose a fraud flag for a particular supplier, but the fraud flag is not confirmed until a specified number of user accounts, for example three (3) user accounts, all have proposed the flag. Or, a proposed fraud flag can be routed to an approval chain of one or more approvers within the customer or associated with a customer-independent administrator and confirmed or activated after passing the approval chain. Approval or activation of a fraud flag can result, via programming, in generating and displaying an alert related to the fraud flag when supplier payment accounts are added, when payment batches are scheduled or approved, or when a supplier is initially onboarded into the e-procurement platform instance 106.

At block 334, after the queries, the process is programmed to generate one or more metrics, alerts, and/or notifications based upon the result set(s) of the queries. The process then can return to block 312 of FIG. 3A. By this process, an initial set of alerts can be generated and stored. Block 334, 310, 312, 313 can execute cooperatively based upon programmatic rules, heuristics, or machine learning algorithms. For example, in one embodiment, the following sets of query and notification logic can be programmed as part of implementing FIG. 3B or block 310 of FIG. 3A:

| | |
|---|---|
| RULE LABEL | Paid to by other customers |
| NOTIFICATION TEXT | At least two other community members have made multiple payments to this account older than 30 days. |
| EXAMPLE INTERPRETATION | Multiple successful payments over 30 days by certain other community members can indicate that those members trust the account; however, this fact is not a guarantee of trustworthiness. |
| RATIONALE FOR NOTIFICATION | Customers spend significant time approving accounts; this information can improve confidence and reduce time to verify an account. |
| SERVICE FOR NOTIFICATION | Approval; Batch payment |
| MINIMUM NUMBER OF CUSTOMERS WHO HAVE APPROVED REMITTANCE INFORMATION | 2 |
| MINIMUM NUMBER OF PAYMENTS IN QUERY RESPONSE | 3 |
| NUMBER OF CUSTOMERS WHO HAVE DEACTIVATED OR REJECTED THIS ACCOUNT | Not applicable |
| WHETHER LAST PAYMENT FAILED | Not applicable |

| | |
|---|---|
| RULE LABEL | First payment to this account |
| NOTIFICATION TEXT | This is the first time that any customer in the community has used this remittance account. |
| EXAMPLE INTERPRETATION | |
| RATIONALE FOR NOTIFICATION | Add an approval chain to flag a payment amount greater than a specified amount if the first payment is being made |
| SERVICE FOR NOTIFICATION | Batch payment |
| MINIMUM NUMBER OF CUSTOMERS WHO HAVE APPROVED REMITTANCE INFORMATION | 1 |
| MINIMUM NUMBER OF PAYMENTS IN QUERY RESPONSE | 0 |
| NUMBER OF CUSTOMERS WHO HAVE DEACTIVATED OR REJECTED THIS ACCOUNT | 0% |
| WHETHER LAST PAYMENT FAILED | |

| | |
|---|---|
| RULE LABEL | Recently created account |
| NOTIFICATION TEXT | This account has been approved by at least two other community members but there are no payments older than 30 days. |
| EXAMPLE INTERPRETATION | While there are no payments over 30 days, the fact that this account has been approved by other community members may indicate that these community members have previously reviewed this account. |
| RATIONALE FOR NOTIFICATION | Provides information that while the account has been used, it is new. |
| SERVICE FOR NOTIFICATION | Approvals; Batch payments |
| MINIMUM NUMBER OF CUSTOMERS WHO HAVE APPROVED REMITTANCE INFORMATION | 2 |
| MINIMUM NUMBER OF PAYMENTS IN QUERY RESPONSE | 2 |
| NUMBER OF CUSTOMERS WHO HAVE DEACTIVATED OR REJECTED THIS ACCOUNT | |
| WHETHER LAST PAYMENT FAILED | |

| | |
|---|---|
| RULE LABEL | Account associated with multiple suppliers |
| NOTIFICATION TEXT | Single remittance account associated with multiple supplier names. |
| EXAMPLE INTERPRETATION | |
| RATIONALE FOR NOTIFICATION | Assists in identifying whether the buyer is mistakenly associating the account with an incorrect supplier. |
| SERVICE FOR NOTIFICATION | Approvals |
| MINIMUM NUMBER OF CUSTOMERS WHO HAVE APPROVED REMITTANCE INFORMATION | 1 |
| MINIMUM NUMBER OF PAYMENTS IN QUERY RESPONSE | 0 |
| NUMBER OF CUSTOMERS WHO HAVE DEACTIVATED OR REJECTED THIS ACCOUNT | 0% |
| WHETHER LAST PAYMENT FAILED | |

| | |
|---|---|
| RULE LABEL | No other community members have used this account for this supplier |
| NOTIFICATION TEXT | Other community members are paying this supplier using different remittance accounts; the current remittance account does not match those accounts. |
| EXAMPLE INTERPRETATION | |
| RATIONALE FOR NOTIFICATION | Can detect potential input of fraudulent data. |
| SERVICE FOR NOTIFICATION | Approvals |
| MINIMUM NUMBER OF CUSTOMERS WHO HAVE APPROVED REMITTANCE INFORMATION | 3 |
| MINIMUM NUMBER OF PAYMENTS IN QUERY RESPONSE | 3 |
| NUMBER OF CUSTOMERS WHO HAVE DEACTIVATED OR REJECTED THIS ACCOUNT | 0% |
| WHETHER LAST PAYMENT FAILED | |

| | |
|---|---|
| RULE LABEL | Account rejected or deactivated by other customers |
| NOTIFICATION TEXT | This account has been rejected or deactivated by at least two other community members. |
| EXAMPLE INTERPRETATION | The rejection of an account by multiple community members likely indicates an issue with the account and the buyer should consider contacting the supplier before approving or making a payment |
| RATIONALE FOR NOTIFICATION | Customers may reject or deactivate accounts if suspicious activity had been detected through other means. |
| SERVICE FOR NOTIFICATION | Approvals; Batch payments |
| MINIMUM NUMBER OF CUSTOMERS WHO HAVE APPROVED REMITTANCE INFORMATION | 3 |
| MINIMUM NUMBER OF PAYMENTS IN QUERY RESPONSE | 5 |
| NUMBER OF CUSTOMERS WHO HAVE DEACTIVATED OR REJECTED THIS ACCOUNT | Greater than 66% |
| WHETHER LAST PAYMENT FAILED | |

| | |
|---|---|
| RULE LABEL | Multiple failed payments |
| NOTIFICATION TEXT | Multiple payments from this account from you or other customers have recently failed. |
| EXAMPLE INTERPRETATION | |
| RATIONALE FOR NOTIFICATION | Accounts are closed regularly, leading to rejection of payment attempts; many weeks' delay can occur in receiving reports of closures of international accounts, so avoiding those with multiple failed payments is better. |
| SERVICE FOR NOTIFICATION | Approvals; Batch payments |
| MINIMUM NUMBER OF CUSTOMERS WHO HAVE APPROVED REMITTANCE INFORMATION | 1 |
| MINIMUM NUMBER OF PAYMENTS IN QUERY RESPONSE | 2 |
| NUMBER OF CUSTOMERS WHO HAVE DEACTIVATED OR REJECTED THIS ACCOUNT | 0% |
| WHETHER LAST PAYMENT FAILED | |

| | |
|---|---|
| RULE LABEL | High rate of failed payments |
| NOTIFICATION TEXT | At least two other community members have had a high rate of failed payments to this account. |
| EXAMPLE INTERPRETATION | Payment failures could indicate a closed account or other issue; the buyer should contact the supplier before approving or attempting a payment. |
| RATIONALE FOR NOTIFICATION | Indicates the importance of accurately determining payment data. |
| SERVICE FOR NOTIFICATION | Approvals; Batch payments |
| MINIMUM NUMBER OF CUSTOMERS WHO HAVE APPROVED REMITTANCE INFORMATION | 3 |
| MINIMUM NUMBER OF PAYMENTS IN QUERY RESPONSE | |
| NUMBER OF CUSTOMERS WHO HAVE DEACTIVATED OR REJECTED THIS ACCOUNT | |
| WHETHER LAST PAYMENT FAILED | Yes [[Please supply other info]] |

| | |
|---|---|
| RULE LABEL | Marked as fraudulent |
| NOTIFICATION TEXT | %account_name% has marked this account as fraudulent |
| EXAMPLE INTERPRETATION | A user with the account name "account_name", in the same enterprise as the current user, has marked this account as fraudulent; caution is advisable, including contacting account_name promptly. |
| RATIONALE FOR NOTIFICATION | Helps ensure that no one in the same organization uses an account that was flagged. |
| SERVICE FOR NOTIFICATION | Approvals; Batch payments |
| MINIMUM NUMBER OF CUSTOMERS WHO HAVE APPROVED REMITTANCE INFORMATION | 1 |
| MINIMUM NUMBER OF PAYMENTS IN QUERY RESPONSE | 10 |
| NUMBER OF CUSTOMERS WHO HAVE DEACTIVATED OR REJECTED THIS ACCOUNT | Not applicable |
| WHETHER LAST PAYMENT FAILED | |

The presentation instructions 128 can be programmed to form notifications and alerts in cooperation with query processing instructions 126. Or, one or more of the payment application, spend control application 112, and pay support application 114 can implement its own notification service that receives notification labels via programmatic calls and then forms application-specific alerts, with or without functions such as alert persistence and/or integration into approval chains or approval chain conditions.

A call to the process described above also can be executed as part of creating a new bank account, preferably after internal validation of the bank account data and external validation of the bank account data is complete. Internal validation can be programmed as requiring one or more approvals of other user accounts before account data can be committed to create a new account. External validation can be programmed as one or more programmatic calls to external services, via APIs that are callable with network requests, to check, for example, whether an ABA routing number is valid or whether a lead portion of an IBAN identifies a known bank.

Embodiments can be programmed to balance the need for updated alerts against performance considerations by combining real-time and targeted, asynchronous alert transmission. For example, the elements described above can be programmed to generate and cause displaying real-time alerts after a bank transfer supplier payment account is initially created using core services of the e-procurement platform instance 106; the spend control application 112 can be called in real-time to synchronize alerts for the new account so that they are available as soon as the account enters an approval chain. Or, when a pay invoice moves to a ready-to-pay state, the elements described above can be programmed to call the spend control application 112 in real-time to synchronize the alerts for any active bank transfer supplier payment accounts that are associated with the supplier to be paid.

2.3 Example Graphical User Interface Implementation

Figure 4B:
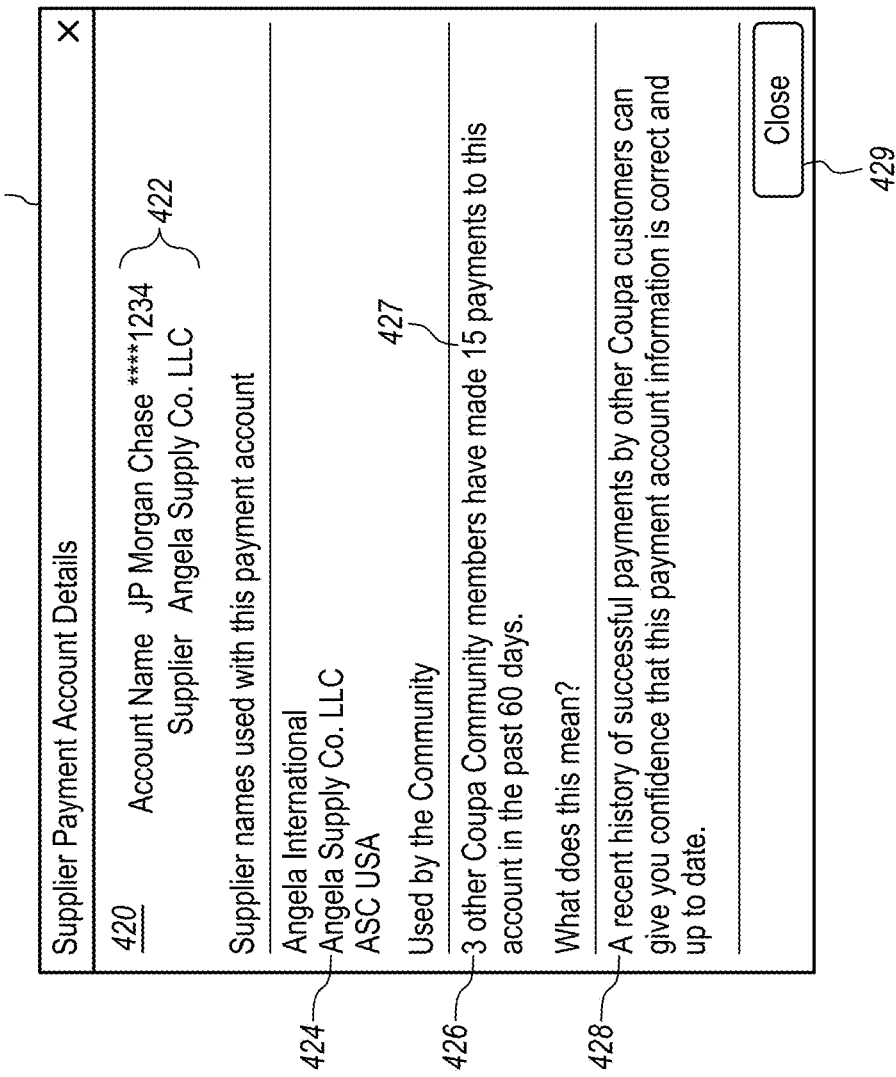

FIG. 4A, FIG. 4B illustrate examples of computer display devices with portions of a graphical user interface that can be programmed to generate and display alerts concerning account data risk issues.

Referring first to FIG. 4A, in one embodiment, a computer display device 400 comprises a graphical user interface having a supplier payment account window 402. In an embodiment, a supplier payment account is identified using an account name 404, which can include masked payment account data that a verified, authorized user can unmask and display if needed. The supplier payment account also includes a plurality of data values 406 such as account name, supplier name, supplier remit-to address, account type, document types, currently, status, and source. The supplier payment account can be associated with an approval chain panel 408 having account icons 410 that graphically, visually represent user accounts of persons in an approval chain whose review and/or approval is required to add, update, or delete a supplier payment account. The supplier payment account details of FIG. 4A can be stored as a record in payment_accounts table 212 (FIG. 2).

In an embodiment, window 402 further comprises a notification panel 412 having a notification header 413, a notification text 414 and, optionally, a link 416. The notification panel 412 can be displayed in any convenient location of window 402 or could be transmitted or visualized in other means such as in a pop-up window or a UI widget. The notification header 413 and notification text 414 correspond to the data that have been previously described in connection with rules and triggers in section 2.2. Optionally, the link 416 is programmed to cause, when selected, invoking a function of the system to display data derived from the result sets, which were generated via FIG. 3A, FIG. 3B, underlying the particular notification shown in the notification panel 412 and providing a basis or explanation of the notification.

FIG. 4B illustrates an example of a payment account details window that can be programmed to be displayed when the link is selected. In an embodiment, a details window 420 comprises account identifying data 422, which can be programmed as a subset of the identifying data that was shown in supplier payment account window 402 (FIG. 4A). The details window 420 may comprises a plurality of explanatory information items, based on the results of prior search queries, to provide a basis for the notification panel 412. For example, the details window 420 can be programmed to display one or more supplier names 424 that have been used with the specified payment account, based upon queries directed to the tables of FIG. 2. The details window 420 also can be programmed to display a first count 426 of other community members that have made a second count 427 of payments to the specified account, also based on queries to the tables of FIG. 2, specifically the payments table. The "community members," in one embodiment, can refer to distinct enterprises, other entities, or user accounts that interoperate with the e-procurement platform instance 106, such as enterprises 350, 352 (FIG. 3A). Interpretive information 428 can be displayed based on the data that have been previously described in connection with rules and triggers in section 2.2. A CLOSE link or button 429 can be provided which, when selected, is programmed to close the details window 420 and return control to supplier payment account window 402 (FIG. 4A).

FIG. 4C illustrates an example of a computer display device with an alternate form of a supplier payment account window. FIG. 4C has the elements and information of FIG. 4A, including notification window 412, but the notification window comprises a header 430 specifying "Recently created account" and notification text 432 specifying "This account has been approved by other Community members but there are no payments older than 30 days". The display of FIG. 4C may be generated according to the programmed rules that have been previously described when queries return result sets in which all payments to the account are within the past 30 days. The notification window 412 may further comprise a link 434 which, when selected, causes generating and displaying a visual panel in the GUI to show information about past payments to the recently created account; the panel may be similar in form to that of FIG. 4B. The data of FIG. 4C could induce a buyer to contact the supplier for further investigation.

FIG. 4D illustrates a further example of a notification panel. In the example of FIG. 4D, the notification panel 412 comprises a header 440 specifying "High rate of failed payments" and notification text 442 specifying "Other Community members have had a high rate of failed payments to this account. The notification panel 412 may further comprise a link 444 which, when selected, causes generating and displaying a visual panel in the GUI to show information about past payments to the recently created account; the panel may be similar in form to that of FIG. 4B. The data of FIG. 4D could induce a buyer to conduct a renewed verification of the supplier payment account details or contact the supplier. Especially for payments directed to countries in which an exact match of account details is required to complete a payment, the data of FIG. 4D could reduce the frequency of bounce back charges imposed by banks or payment rails when failed payments occur.

FIG. 4E illustrates a further example of a notification panel. In the example of FIG. 4E, the notification panel 412 comprises a header 450 specifying "Rejected or deactivated by other customers" and notification text 452 specifying "At least two other Community members have rejected or deactivated to this account. The notification panel 412 may further comprise a link 454 which, when selected, causes generating and displaying a visual panel in the GUI to show information about past payments to the recently created account; the panel may be similar in form to that of FIG. 4B. The data of FIG. 4E could induce a buyer to review whether the payment account should be used. In an embodiment, the programmed rules and FIG. 4E do not overtly assert that a supplier payment account is associated with fraud; that judgment is left to the user account or administrator. Instead, the system provides objective data about actions that other accounts have taken for a supplier payment account.

FIG. 4E can be based, in part, upon data in the payments accounts table 212 that has been stored in response to user account interaction with a visual dialog in which the user account specifies particular reasons for rejecting an account. FIG. 4F illustrates an example computer display device with graphical user interface in which rejection reasons are submitted. In the example of FIG. 4F, a rejection window 460 comprises a supplier detail region 462 that specifies information relating to a supplier, and a set of radio buttons 463 or other graphical user interface widgets. Each of the radio buttons 463 is near text that associates a selection of that button with a different substantive reason for rejecting the account, which can be represented in stored data using a different stored value. In an embodiment, to submit a rejection action via a SUBMIT button 464, a user account must select one of the radio buttons 463. Data representing the selected radio button then is stored in the payments repository in association with other supplier payment account information, and can be used in queries and the programmed rules that have been previously described to cause display of FIG. 4E and/or display detailed information in support of FIG. 4E. Thus, differential warnings or notifications can be generated and displayed, based on different programmed rules, and based on the number of records that are marked with different values of the radio buttons or selections.

For example, a programmed rule can generate a TRUE result when a result set from a query includes at least two records in which a payment account has a status of REJECTED and a reason code corresponding to "This account may have fraudulent activity". FIG. 4G illustrates a further example of a notification panel. In the example of FIG. 4G, the notification panel 412 comprises a header 470 specifying "Marked as fraudulent" and notification text 472 specifying "Rudy Okoye has marked this account as fraudulent." The label "Rudy Okoye," in this example, is a hypothetical user account name; in an embodiment, the notification text 472 is programmed to specify the true user account name of a user account of the customer for whom another user is logged in and receiving the notification. That is, the notification panel of FIG. 4G only displays user account names for the same organization or entity, and the programmatic rule that causes displaying FIG. 4G is based upon markings, via FIG. 4F, for the same entity as the current user. Further, in an embodiment, when a supplier payment account is marked as fraudulent so that FIG. 4G would be generated, the e-procurement platform instance 106 is programmed to block any payment that any user account creates and queues for delivery to that account.

The notification panel 412 may further comprise a link 474 which, when selected, causes generating and displaying a visual panel in the GUI to show information about past payments to the recently created account; the panel may be similar in form to that of FIG. 4B.

2.4 Selected Applications 2.4.1 General

Embodiments offer several practical applications. First, embodiments can streamline the approval of new remittance account data. Calls to the service of this disclosure can be used in optimizing which approver accounts need to be added in an approval workflow when a new account is added. For example, a system or service can be programmed to require fewer or different approvers if an account for a particular supplier is used by multiple customers. Or, the system or service can be programmed to require additional or different approvers if calls to the present service result in returning risk signals. Further, the technology of this disclosure can show usage information for an account based upon instance data and community data, which can assist an approving account or user to understand risk areas that may need further investigation.

Next, embodiments can streamline the approval of payment batches. Calls to the service of this disclosure can be used in optimizing which approver accounts need to be added in an approval workflow when approving payment batches. For example, a system or service can be programmed to require additional or different approvers if calls to the service of this disclosure return risk signals for one or more payment accounts. Further, the technology of this disclosure can show usage information for an account based upon instance data and community data, which can assist an approving account or user to understand risk areas that may need further investigation for payment batches, or show that a current payment batch or individual payment is the first payment to a particular account.

2.4.2 Recommendations of Supplier Payment Accounts

Figure 3C:
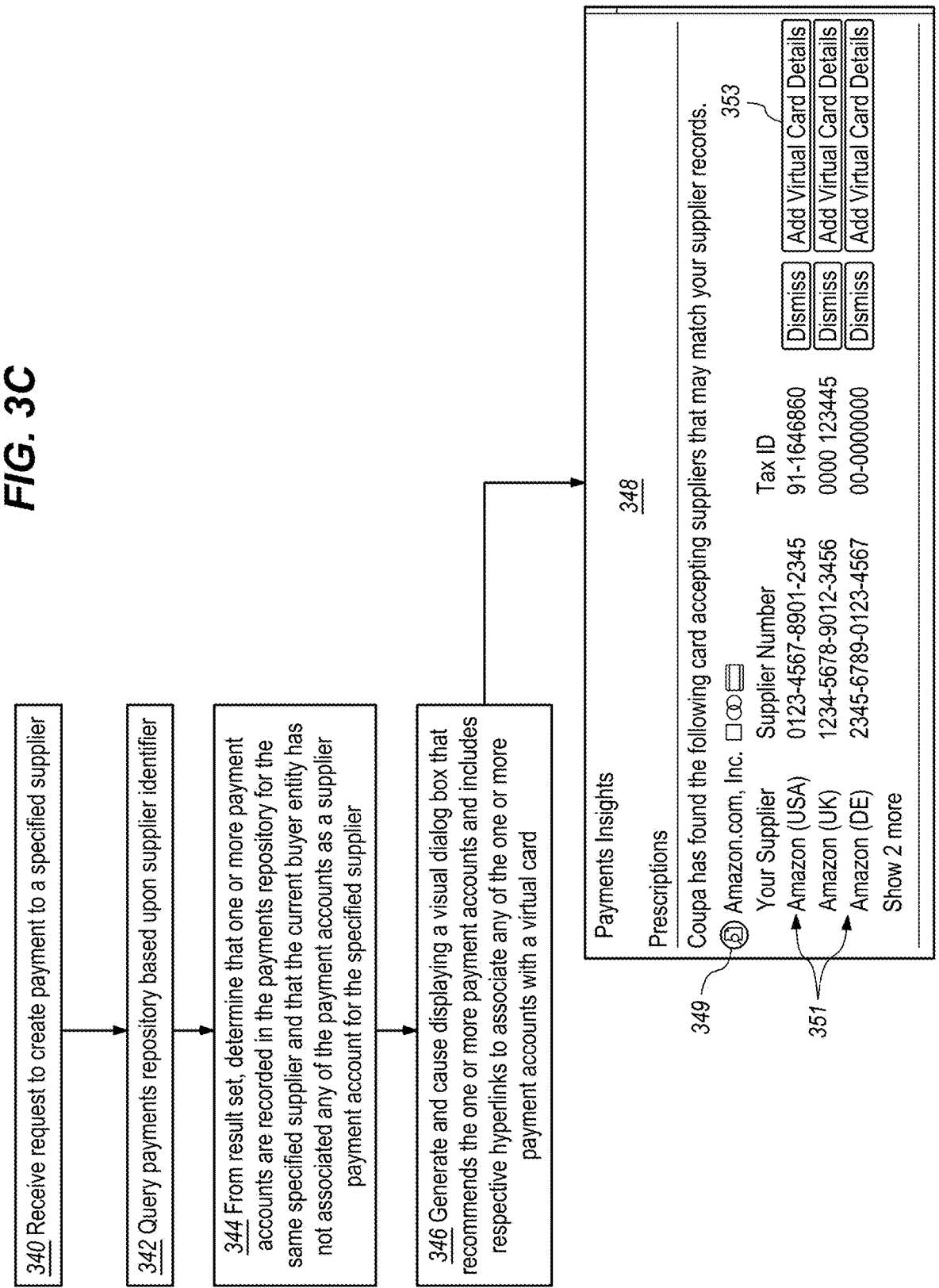
FIG. 3C illustrates one example of using a payments repository to generate and transmit recommendations to change the configuration of an e-procurement system.

FIG. 3C illustrates one example of using a payments repository to generate and transmit recommendations to change the configuration of an e-procurement system. In an embodiment, the payments application 110 is programmed at block 340 to receive a request to create a payment to a specified supplier. For example, a user account is logged into e-procurement platform instance 106, executes the payment application 110, chooses an open invoice that is associated with the supplier, and signals the payment application to create a new payment to the supplier. At this point, in one embodiment, the user account may select an existing supplier payment account that is associated with the supplier, if one has been configured. Or, in an embodiment, at block 342, the process is programmed to query the payments repository 120 based upon a supplier identifier for the specified supplier. The query causes the payments repository 120 to programmatically return a result set of records of payment accounts that match the supplier identifier.

At block 344, the process is programmed to determine, from the result set, that one or more payment accounts are recorded in the payment repository for the same specified supplier, and that the current buyer entity has not associated any of the payment accounts as a supplier payment account for the specified supplier. In other words, other customers, entities, or instances have engaged in transactions that resulted in the processes of this disclosure creating records in the payments repository 120 for payment accounts for the same supplier, but the present entity or user account is unaware of those records and has not created an association of one of those payment accounts with the specified supplier. However, the community intelligence represented in the records, in payments repository 120, created by other entities now can be used to benefit the current entity, customer, or user account, and change its configuration of the e-procurement platform instance 106.

In an embodiment, in block 346, the process is programmed to generate and cause displaying, in a graphical user interface on the buyer computer, a visual dialog box that recommends the one or more payment accounts and includes respective hyperlinks to associate any of the one or more payment accounts with a virtual card. For example, the process may be programmed to display a graphical panel 348 comprising a supplier identifier 349, a plurality of rows 351 that identify aspects of payment accounts that have been recorded in the payments repository 120 as a result of other transactions, and a plurality of graphical buttons 353, each of the buttons being associated with a different one of the payment accounts. In an embodiment, rows 351 identify supplier labels, record numbers, and tax identifiers, but not specific account numbers.

Buttons 353 can be programmed, when selected, to cause generating a dialog box by which the current user account can add a virtual card to the payment account. The virtual card is associated with a payment account of the buyer, effectively tying a card account of the buyer to direct payment to the payment account of the supplier. In this manner, by selecting one of the buttons 353, based on the recommendations represented in panel 348, the user account can cause reconfiguring its instance of e-procurement platform instance 106 to use a payment account for the specified supplier of supplier identifier 349 even when the user account was previously unaware that a payment account had been recorded in the payments repository 120 for that supplier. Stated another way, because the payments repository 120 "knows" that a payment account exists for the supplier, and that other buyer computers have directed payments to that account, the payment application 110 can be programmed to recommend that payment account to a user account of a different buyer entity for use for the first time. Ancillary benefits can be realized; for example, by associating a virtual card with a new payment account that can be used, the buyer could earn a rebate from its card issuer that otherwise would not be available.

2.4.2 Validation of Payment Account Fingerprint Values

In some embodiments, the account fingerprint values that have been created using the techniques described herein can be transmitted to entities other than buyer computers and supplier computers that hold accounts in the e-procurement platform instance 106.

For example, assume that a particular supplier, which does hold an account in the e-procurement platform instance 106, wishes to receive a payment from a buyer entity that is not using the platform. The payment application 110 or another application could be programmed to enable the particular supplier to retrieve one or more reference_key values for supplier payment accounts of the particular supplier and to send the buyer entity copies of reference_key files, values, or links into the e-procurement platform instance 106. In some embodiments, the payment application 110 or another application could be programmed to generate a template-based email message to the buyer entity that identifies the supplier and includes a representation of the reference_key value of a supplier payment account and/or a link into the e-procurement platform instance 106. In response, the buyer entity could invoke the link to call a fingerprint validation service of the e-procurement platform instance 106, for example, a parameterized HTTP POST request that includes a validation request code, a supplier identifier, and a copy of the fingerprint.

The payment application 110 or another application of e-procurement platform instance 106 can be programmed to query the payments repository 120 to determine whether the fingerprint matches a record in the repository. The payment application 110 or another application of e-procurement platform instance 106 can be programmed to generate a validation response or error response. A validation response could assert that the fingerprint is a valid fingerprint that the e-procurement platform instance 106 had previously generated. In some embodiments, the validation response also could include one or more account details corresponding to account values that the fingerprint represents. Examples include some or all digits of an account number, country, etc. Any such positive validation response would carry a high level of confidence for the buyer or other outside party because of the volume of transactions that the e-procurement platform instance 106 processes and the number of records in the payments repository 2.5 Application Programming Interface Example In an embodiment, the architecture, processes, rules, and algorithms that have been previously described can be called using an application programming interface (API) having call definitions such as the following:

CREATE fingerprint. A calling system sends bank account details, and the API returns a fingerprint value. This call will persist, to the payment repository 120, both the bank account details and the fingerprint value, which can be referenced later when creating customer-specific fingerprints.

GET/POST fingerprint payment summary. A calling system sends a fingerprint value and, optionally, a customer identifier. In some embodiments, an optional parameter can exclude the specified customer from the summary data, thereby executing only on community data. The API returns a number of customers, successful payments, failed payments, legal names, date of first successful payment, and date of last successful payment. In some embodiments, the call may include a list of multiple fingerprint values; for example, in one implementation, up to 50 values can be supplied in a call, which is expected to allow a maximum API response time of about 120 seconds. A POST form of call can be supported to provide compatibility with systems that do not support adding a payload to a GET request.

CREATE payment accounts. The calling system sends payment account data, which should match a bank account that is already stored in the payment repository. The API returns a response message that can include a SUCCESS or ERROR indicator, and the fingerprint value of the matching account data. The fingerprint value is returned to enable a calling system to store the fingerprint value in data stores of the calling system if it was not previously stored.

CREATE payments.

UPDATE payment account. The calling system typically issues this call when a supplier payment account has been approved, rejected, or deactivated in other functions of the calling system. The calling system provides a payment account identifier, status, and reason code. When the reason code specifies rejected or deactivated, then the API updates the payment repository 120 with the status value and reason code if specified. In all cases, a value specifying that the account data was exported to another system can be cleared. The API can initiate a call to synchronize the payment account details to the repository. A response with a SUCCESS or ERROR indication can be returned.

In an embodiment, an API call is programmed to receive a parameterized HTTP POST or GET request to evaluate a payment account for fraud potential. In various embodiments, an evaluation request can be submitted to the API with a single fingerprint value or a plurality of fingerprint values. In one embodiment, the evaluation request is programmed with:

| Request Headers: | |
|---|---|
| Header | Value |
| Content-Type | application/json |
| X-Coupa-Instance | Instance name |

| Request Parameters: | | |
|---|---|---|
| Field | Type | Description |
| customer-uuid | String | Customer UUID |
| enable_realtime_checks | Boolean | If set to true, alert results are delivered immediately |

| Request Body: | | |
|---|---|---|
| Field | Type | Description |
| fingerprints | Array | Each element of an array represents a fingerprint the bank account or payment account |
| id | Integer | payment account id. |
| fingerprint | String | global representation of this payment account. |

An example request body is:

```
{
  fingerprints: [
    {
      id: 1938192,
      fingerprint: 'd96cba944a382da7b356446c152c4
a2b7325ba8cc6a2054d5bd1618b3e4 bdd12'
    },
    {
      id: 9198810,
      fingerprint: '52a99df6885b40c0a46bbd38ab492
9798785bf2c4f7b0805118219085d4 7fbff'
    }
  ]
}
```

Example response codes can include:
Success Response: HTTP Status Code 200
Error Response: HTTP Status Code 4xx such as 400 Bad request
 HTTP Status Code 5xx such as 500 Internal Server Error or 504 Gateway Timeout error.

An example form of Success response can be programmed with the form:

```
{
"supplier payment accounts": [
  {
    "reference key": "d96cba944a382da7b356446c152c4
a2b7325ba8cc6a2054d5bd1618b3e4 bdd12"
    "status": "completed",
    "alerts-returned":true,
    "last-updated-at": "2019-01-02 00:00:00",
    "alerts":[
      {
        "type": "high rate of failed payments",
        "alert-object-type": "CoupaPay :: PaymentAccount",
        "alert-objects": [
          {
            "id":312134
          }
        ]
      },
      {
        "type": "account rejected by other customers",
        "alert-object-type": "CoupaPay :: PaymentAccount",
        "alert-objects": [
          {
            "id":312134
          }
        ]
      },
      {
        "type": "paid to by other customers",
        "alert-object-type": "CoupaPay :: PaymentAccount",
        "alert-objects": [
          {
            "id":312134
          }
        ],
        "references":[
```

```
{
    "reason-key": "number of customers",
    "reason-value":"3"
    },
    {
    "reason-key": "number of payments",
    "reason-value":"15"
    },
    {"reason-key":"supplier names used",
    "reason-value":"Angela International, Angela Supply Co.
LLC, ASC USA"
    }
    ]
},
{
    type":"recently created account",
    "alert-object-type": "CoupaPay :: PaymentAccount",
    "alert-objects": [
        {
            "id":312134
        }
        ],
        "references": ["reason-key": "no payments in last x days",
        "reason-value": "30"
        }
        ],
    }
  ]
}
```

An example form of Success response, when no alert has been found, can be programmed with the form:

```
{
    fingerprints: [
        {
        "reference key":'d96cba944a382da7b356446c152c4
        a2b7325ba8cc6a2054d5bd1618b3e4
        bdd12',
        "status": "completed", "alerts-returned": false
        }
    ]
}
```

An example form of Error response can be programmed with the form:

```
{
"status": "error", "alerts-returned": false, "error-message":
"Failed to call Pay API."
}
```

3. Implementation Example—Hardware Overview

According to one embodiment, the techniques described herein are implemented by at least one computing device. The techniques may be implemented in whole or in part using a combination of at least one server computer and/or other computing devices that are coupled using a network, such as a packet data network. The computing devices may be hard-wired to perform the techniques, or may include digital electronic devices such as at least one application-specific integrated circuit (ASIC) or field programmable gate array (FPGA) that is persistently programmed to perform the techniques, or may include at least one general purpose hardware processor programmed to perform the techniques pursuant to program instructions in firmware, memory, other storage, or a combination. Such computing devices may also combine custom hard-wired logic, ASICs, or FPGAs with custom programming to accomplish the described techniques. The computing devices may be server computers, workstations, personal computers, portable computer systems, handheld devices, mobile computing devices, wearable devices, body mounted or implantable devices, smartphones, smart appliances, internetworking devices, autonomous or semi-autonomous devices such as robots or unmanned ground or aerial vehicles, any other electronic device that incorporates hard-wired and/or program logic to implement the described techniques, one or more virtual computing machines or instances in a data center, and/or a network of server computers and/or personal computers.

Figure 5:
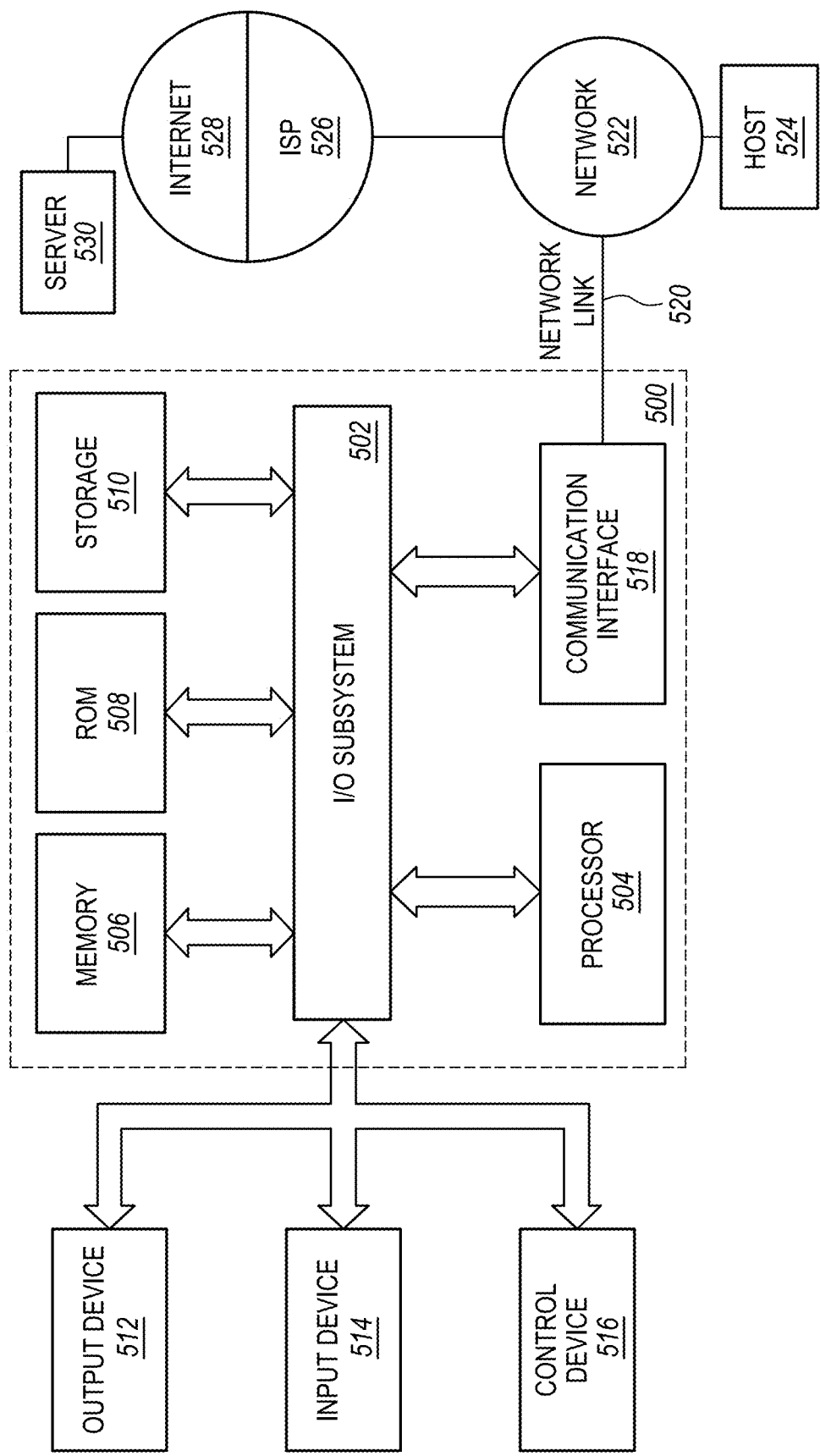
FIG. 5 illustrates a computer system with which one embodiment could be implemented.

FIG. 5 is a block diagram that illustrates an example computer system with which an embodiment may be implemented. In the example of FIG. 5, a computer system 500 and instructions for implementing the disclosed technologies in hardware, software, or a combination of hardware and software, are represented schematically, for example as boxes and circles, at the same level of detail that is commonly used by persons of ordinary skill in the art to which this disclosure pertains for communicating about computer architecture and computer systems implementations.

Computer system 500 includes an input/output (I/O) subsystem 502 which may include a bus and/or other communication mechanism(s) for communicating information and/or instructions between the components of the computer system 500 over electronic signal paths. The I/O subsystem 502 may include an I/O controller, a memory controller and at least one I/O port. The electronic signal paths are represented schematically in the drawings, for example as lines, unidirectional arrows, or bidirectional arrows.

At least one hardware processor 504 is coupled to I/O subsystem 502 for processing information and instructions. Hardware processor 504 may include, for example, a general-purpose microprocessor or microcontroller and/or a special-purpose microprocessor such as an embedded system or a graphics processing unit (GPU) or a digital signal processor or ARM processor. Processor 504 may comprise an integrated arithmetic logic unit (ALU) or may be coupled to a separate ALU.

Computer system 500 includes one or more units of memory 506, such as a main memory, which is coupled to I/O subsystem 502 for electronically digitally storing data and instructions to be executed by processor 504. Memory 506 may include volatile memory such as various forms of random-access memory (RAM) or other dynamic storage device. Memory 506 also may be used for storing temporary variables or other intermediate information during execution of instructions to be executed by processor 504. Such instructions, when stored in non-transitory computer-readable storage media accessible to processor 504, can render computer system 500 into a special-purpose machine that is customized to perform the operations specified in the instructions.

Computer system 500 further includes non-volatile memory such as read only memory (ROM) 508 or other static storage device coupled to I/O subsystem 502 for storing information and instructions for processor 504. The ROM 508 may include various forms of programmable ROM (PROM) such as erasable PROM (EPROM) or electrically erasable PROM (EEPROM). A unit of persistent storage 510 may include various forms of non-volatile RAM (NVRAM), such as FLASH memory, or solid-state storage, magnetic disk or optical disk such as CD-ROM or DVD-ROM and may be coupled to T/O subsystem 502 for storing information and instructions. Storage 510 is an example of a non-transitory computer-readable medium that may be used to store instructions and data which when executed by the processor 504 cause performing computer-implemented methods to execute the techniques herein.

The instructions in memory 506, ROM 508 or storage 510 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. The instructions may implement a web server, web application server or web client. The instructions may be organized as a presentation layer, application layer and data storage layer such as a relational database system using structured query language (SQL) or no SQL, an object store, a graph database, a flat file system or other data storage.

Computer system 500 may be coupled via I/O subsystem 502 to at least one output device 512. In one embodiment, output device 512 is a digital computer display. Examples of a display that may be used in various embodiments include a touch screen display or a light-emitting diode (LED) display or a liquid crystal display (LCD) or an e-paper display. Computer system 500 may include other type(s) of output devices 512, alternatively or in addition to a display device. Examples of other output devices 512 include printers, ticket printers, plotters, projectors, sound cards or video cards, speakers, buzzers or piezoelectric devices or other audible devices, lamps or LED or LCD indicators, haptic devices, actuators or servos.

At least one input device 514 is coupled to I/O subsystem 502 for communicating signals, data, command selections or gestures to processor 504. Examples of input devices 514 include touch screens, microphones, still and video digital cameras, alphanumeric and other keys, keypads, keyboards, graphics tablets, image scanners, joysticks, clocks, switches, buttons, dials, slides, and/or various types of sensors such as force sensors, motion sensors, heat sensors, accelerometers, gyroscopes, and inertial measurement unit (IMU) sensors and/or various types of transceivers such as wireless, such as cellular or Wi-Fi, radio frequency (RF) or infrared (IR) transceivers and Global Positioning System (GPS) transceivers.

Another type of input device is a control device 516, which may perform cursor control or other automated control functions such as navigation in a graphical interface on a display screen, alternatively or in addition to input functions. Control device 516 may be a touchpad, a mouse, a trackball, or cursor direction keys for communicating direction information and command selections to processor 504 and for controlling cursor movement on display 512. The input device may have at least two degrees of freedom in two axes, a first axis (e.g., x) and a second axis (e.g., y), that allows the device to specify positions in a plane. Another type of input device is a wired, wireless, or optical control device such as a joystick, wand, console, steering wheel, pedal, gearshift mechanism or other type of control device. An input device 514 may include a combination of multiple different input devices, such as a video camera and a depth sensor.

In another embodiment, computer system 500 may comprise an internet of things (IoT) device in which one or more of the output device 512, input device 514, and control device 516 are omitted. Or, in such an embodiment, the input device 514 may comprise one or more cameras, motion detectors, thermometers, microphones, seismic detectors, other sensors or detectors, measurement devices or encoders and the output device 512 may comprise a special-purpose display such as a single-line LED or LCD display, one or more indicators, a display panel, a meter, a valve, a solenoid, an actuator or a servo.

When computer system 500 is a mobile computing device, input device 514 may comprise a global positioning system (GPS) receiver coupled to a GPS module that is capable of triangulating to a plurality of GPS satellites, determining and generating geo-location or position data such as latitude-longitude values for a geophysical location of the computer system 500. Output device 512 may include hardware, software, firmware and interfaces for generating position reporting packets, notifications, pulse or heartbeat signals, or other recurring data transmissions that specify a position of the computer system 500, alone or in combination with other application-specific data, directed toward host 524 or server 530.

Computer system 500 may implement the techniques described herein using customized hard-wired logic, at least one ASIC or FPGA, firmware and/or program instructions or logic which when loaded and used or executed in combination with the computer system causes or programs the computer system to operate as a special-purpose machine. According to one embodiment, the techniques herein are performed by computer system 500 in response to processor 504 executing at least one sequence of at least one instruction contained in main memory 506. Such instructions may be read into main memory 506 from another storage medium, such as storage 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage 510. Volatile media includes dynamic memory, such as memory 506. Common forms of storage media include, for example, a hard disk, solid state drive, flash drive, magnetic data storage medium, any optical or physical data storage medium, memory chip, or the like.

Storage media is distinct from but may be used in conjunction with transmission media. Transmission media participates in transferring information between storage media. For example, transmission media includes coaxial cables, copper wire and fiber optics, including the wires that comprise a bus of I/O subsystem 502. Transmission media can also take the form of acoustic or light waves, such as those generated during radio-wave and infra-red data communications.

Various forms of media may be involved in carrying at least one sequence of at least one instruction to processor 504 for execution. For example, the instructions may initially be carried on a magnetic disk or solid-state drive of a remote computer. The remote computer can load the instructions into its dynamic memory and send the instructions over a communication link such as a fiber optic or coaxial cable or telephone line using a modem. A modem or router local to computer system 500 can receive the data on the communication link and convert the data to a format that can be read by computer system 500. For instance, a receiver such as a radio frequency antenna or an infrared detector can receive the data carried in a wireless or optical signal and appropriate circuitry can provide the data to I/O subsystem 502 such as place the data on a bus. I/O subsystem 502 carries the data to memory 506, from which processor 504 retrieves and executes the instructions. The instructions received by memory 506 may optionally be stored on storage 510 either before or after execution by processor 504.

Computer system 500 also includes a communication interface 518 coupled to bus 502. Communication interface 518 provides a two-way data communication coupling to network link(s) 520 that are directly or indirectly connected to at least one communication networks, such as a network 522 or a public or private cloud on the Internet. For example, communication interface 518 may be an Ethernet networking interface, integrated-services digital network (ISDN) card, cable modem, satellite modem, or a modem to provide a data communication connection to a corresponding type of communications line, for example an Ethernet cable or a metal cable of any kind or a fiber-optic line or a telephone line. Network 522 broadly represents a local area network (LAN), wide-area network (WAN), campus network, internetwork or any combination thereof. Communication interface 518 may comprise a LAN card to provide a data communication connection to a compatible LAN, or a cellular radiotelephone interface that is wired to send or receive cellular data according to cellular radiotelephone wireless networking standards, or a satellite radio interface that is wired to send or receive digital data according to satellite wireless networking standards. In any such implementation, communication interface 518 sends and receives electrical, electromagnetic or optical signals over signal paths that carry digital data streams representing various types of information.

Network link 520 typically provides electrical, electromagnetic, or optical data communication directly or through at least one network to other data devices, using, for example, satellite, cellular, Wi-Fi, or BLUETOOTH technology. For example, network link 520 may provide a connection through a network 522 to a host computer 524.

Furthermore, network link 520 may provide a connection through network 522 or to other computing devices via internetworking devices and/or computers that are operated by an Internet Service Provider (ISP) 526. ISP 526 provides data communication services through a world-wide packet data communication network represented as internet 528. A server computer 530 may be coupled to internet 528. Server 530 broadly represents any computer, data center, virtual machine or virtual computing instance with or without a hypervisor, or computer executing a containerized program system such as DOCKER or KUBERNETES. Server 530 may represent an electronic digital service that is implemented using more than one computer or instance and that is accessed and used by transmitting web services requests, uniform resource locator (URL) strings with parameters in HTTP payloads, API calls, app services calls, or other service calls. Computer system 500 and server 530 may form elements of a distributed computing system that includes other computers, a processing cluster, server farm or other organization of computers that cooperate to perform tasks or execute applications or services. Server 530 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. Server 530 may comprise a web application server that hosts a presentation layer, application layer and data storage layer such as a relational database system using structured query language (SQL) or no SQL, an object store, a graph database, a flat file system or other data storage.

Computer system 500 can send messages and receive data and instructions, including program code, through the network(s), network link 520 and communication interface 518. In the Internet example, a server 530 might transmit a requested code for an application program through Internet 528, ISP 526, local network 522 and communication interface 518. The received code may be executed by processor 504 as it is received, and/or stored in storage 510, or other non-volatile storage for later execution.

The execution of instructions as described in this section may implement a process in the form of an instance of a computer program that is being executed, and consisting of program code and its current activity. Depending on the operating system (OS), a process may be made up of multiple threads of execution that execute instructions concurrently. In this context, a computer program is a passive collection of instructions, while a process may be the actual execution of those instructions. Several processes may be associated with the same program; for example, opening up several instances of the same program often means more than one process is being executed. Multitasking may be implemented to allow multiple processes to share processor 504. While each processor 504 or core of the processor executes a single task at a time, computer system 500 may be programmed to implement multitasking to allow each processor to switch between tasks that are being executed without having to wait for each task to finish. In an embodiment, switches may be performed when tasks perform input/output operations, when a task indicates that it can be switched, or on hardware interrupts. Time-sharing may be implemented to allow fast response for interactive user applications by rapidly performing context switches to provide the appearance of concurrent execution of multiple processes simultaneously. In an embodiment, for security and reliability, an operating system may prevent direct communication between independent processes, providing strictly mediated and controlled inter-process communication functionality.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computer-implemented method, comprising:
using an e-procurement platform instance that executes application programming interface (API) calls and that is programmed to host thousands of user accounts that are associated with a plurality of different entities, receiving, from a buyer computer, supplier payment account data for a dataset representing a payment to a supplier;
creating, using a secret key and a hash algorithm, a cryptographically secure fingerprint based on the supplier payment account data, wherein the cryptographically secure fingerprint is a digital data value that represents a payment account of the supplier and is not based on identifiable customer data, the using of the hash algorithm reduces a likelihood that the created cryptographically secure fingerprint is the same as another fingerprint, and the secret key is stored in an external key store;
using the cryptographically secure fingerprint and at least a portion of the supplier payment account data, programmatically transmitting a structured database query to a digital data repository, the digital data repository comprising at least hundreds of thousands of records of transactions that included other datasets representing other payments, the digital data repository being separate from the external key store;
in response to the querying, receiving a result set of a plurality of supplier payment datasets, based on the records of transactions, and determining that a fingerprint attribute associated with the result set matches the cryptographically secure fingerprint, the supplier payment datasets representing past submissions of payments to the payment account of the supplier;
in response to determining that the fingerprint attribute associated with the result set matches the cryptographically secure fingerprint, based on the result set and a plurality of programmatic rules, calculating one or more notification metrics and selecting a notification from among a plurality of programmed notifications and transmitting, to the buyer computer, presentation instructions which when rendered using the buyer computer cause displaying the one or more notification metrics and a notification text in a visual panel of a graphical user interface (GUI), wherein the visual panel is generated and displayed on the GUI upon a selection of a link,
synchronizing the cryptographically secure fingerprint with one or more applications associated with the instance, the synchronizing causing the cryptographically secure fingerprint to be available for use by the one or more applications; and
generating a fingerprint copy that is a copy of the cryptographically secure fingerprint, wherein the fingerprint copy is transmittable to one or more other buyer computers that are not using the e-procurement platform and is used to generate a validation response, confirming that the fingerprint copy is valid, during an interaction between the one or more other buyer computers and the supplier.

2. The method of claim 1, further comprising executing a particular programmatic rule, the particular programmatic rule being programmed to search the result set and to generate a list of two or more supplier names that are represented in the result set and including the list of supplier names in the presentation instructions.

3. The method of claim 1, further comprising executing a particular programmatic rule, the particular programmatic rule being programmed to search the result set and to determine that the supplier payment account has been approved by two or more of the user accounts and that none of the past submissions of payments are associated with a payment date value older than a specified period.

4. The method of claim 1, further comprising executing a particular programmatic rule, the particular programmatic rule being programmed to search the result set and to determine that more than 65% of the past submissions of payments to the supplier payment account have yielded failed payments.

5. The method of claim 1, further comprising executing a particular programmatic rule, the particular programmatic rule being programmed to search the result set and to determine that the supplier payment account has been rejected or deactivated by two or more of the user accounts.

6. The method of claim 1, further comprising:
executing a particular programmatic rule, the particular programmatic rule being programmed to search the result set and display to a user account of a same entity as the buyer computer that another user account of the same entity has marked the supplier payment account as fraudulent;
configuring the e-procurement platform instance to block a submission of a new payment from the buyer computer to the supplier payment account.

7. The method of claim 1, further comprising:
determining, by programmatically searching the result set, that one or more other payment accounts are specified in other records of the digital data repository for the supplier, and that one of the entities associated with the buyer computer has not associated any of the other payment accounts with the supplier;
in response thereto, generating and causing displaying, in a graphical user interface on the buyer computer, a visual dialog box having a plurality of rows respectively identifying the one or more other payment accounts and comprising a plurality of hyperlinks respectively associated with the plurality of rows;
each hyperlink in the plurality of hyperlinks being programmed, when selected, to associate one of the one or more other payment accounts with a virtual card.

8. The method of claim 1, wherein the hash algorithm is a one-way SHA-256 hash, and the cryptographically secure fingerprint is created using the one-way SHA-256 hash over a country-specific concatenation of a plurality of elements of the supplier payment account data.

9. The method of claim 8, the plurality of elements comprising a country value specifying United States of America, an ABA routing number and a bank account number.

10. The method of claim 1, the records of the digital data repository being organized using a plurality of relational database tables comprising: a supplier references table being related indirectly to a payments account table; a payments table being related to the payment accounts table; the payments account table being related to a fingerprints table; the fingerprints table being related to a bank accounts table.

11. The method of claim 10, the fingerprints table comprising columns that associate a fingerprint value, a randomly or pseudorandomly generated reference key, and a type of account from which the fingerprint value was created.

12. The method of claim 10, further comprising, in response to the querying, determining that the fingerprint value does not match a row in the fingerprints table, and in response: creating a new row in the fingerprints table, the new row having a row identifier; storing the row identifier in the payment accounts table in association with customer data identifying one of the entities that is associated with the buyer computer; and storing the fingerprint value in the new row of the fingerprints table.

13. One or more non-transitory computer-readable storage media storing one or more sequences of stored program instructions which, when executed using one or more processors, cause the one or more processors to execute:
    using an e-procurement platform instance that executes application programming interface (API) calls and that is programmed to host thousands of user accounts that are associated with a plurality of different entities, receiving, from a buyer computer, supplier payment account data for a dataset representing a payment to a supplier;
    creating, using a secret key and a hash algorithm, a cryptographically secure fingerprint based on the supplier payment account data, wherein the cryptographically secure fingerprint is a digital data value that represents a payment account of the supplier and is not based on identifiable customer data, the using of the hash algorithm reduces a likelihood that the created cryptographically secure fingerprint is the same as another fingerprint, and the secret key is stored in an external key store;
    using the cryptographically secure fingerprint and at least a portion of the supplier payment account data, programmatically transmitting a structured database query to a digital data repository, the digital data repository comprising at least hundreds of thousands of records of transactions that included other datasets representing other payments, the digital data repository being separate from the external key store;
    in response to the querying, receiving a result set of a plurality of supplier payment datasets, based on the records of transactions, and determining that a fingerprint attribute associated with the result set matches the cryptographically secure fingerprint, the supplier payment datasets representing past submissions of payments to the payment account of the supplier;
    in response to determining that the fingerprint attribute associated with the result set matches the cryptographically secure fingerprint, based on the result set and a plurality of programmatic rules, calculating one or more notification metrics and selecting a notification from among a plurality of programmed notifications and transmitting, to the buyer computer, presentation instructions which when rendered using the buyer computer cause displaying the one or more notification metrics and a notification text in a visual panel of a graphical user interface (GUI), wherein the visual panel is generated and displayed on the GUI upon a selection of a link,
    synchronizing the cryptographically secure fingerprint with one or more applications associated with the instance, the synchronizing causing the cryptographically secure fingerprint to be available for use by the one or more applications; and
    generating a fingerprint copy that is a copy of the cryptographically secure fingerprint, wherein the fingerprint copy is transmittable to one or more other buyer computers that are not using the e-procurement platform and is used to generate a validation response, confirming that the fingerprint copy is valid, during an interaction between the one or more other buyer computers and the supplier.

14. The one or more non-transitory computer-readable storage media of claim 13, further comprising one or more sequences of stored program instructions which, when executed using the one or more processors, cause the one or more processors to execute: executing a particular programmatic rule, the particular programmatic rule being programmed to search the result set and to generate a list of two or more supplier names that are represented in the result set and including the list of supplier names in the presentation instructions.

15. The one or more non-transitory computer-readable storage media of claim 13, further comprising one or more sequences of stored program instructions which, when executed using the one or more processors, cause the one or more processors to execute: executing a particular programmatic rule, the particular programmatic rule being programmed to search the result set and to determine that the supplier payment account has been approved by two or more of the user accounts and that none of the past submissions of payments are associated with a payment date value older than a specified period.

16. The one or more non-transitory computer-readable storage media of claim 13, further comprising one or more sequences of stored program instructions which, when executed using the one or more processors, cause the one or more processors to execute: executing a particular programmatic rule, the particular programmatic rule being programmed to search the result set and to determine that more than 65% of the past submissions of payments to the supplier payment account have yielded failed payments.

17. The one or more non-transitory computer-readable storage media of claim 13, further comprising one or more sequences of stored program instructions which, when executed using the one or more processors, cause the one or more processors to execute: executing a particular programmatic rule, the particular programmatic rule being programmed to search the result set and to determine that the supplier payment account has been rejected or deactivated by two or more of the user accounts.

18. The one or more non-transitory computer-readable storage media of claim 13, further comprising one or more sequences of stored program instructions which, when executed using the one or more processors, cause the one or more processors to execute:
    executing a particular programmatic rule, the particular programmatic rule being programmed to search the result set and display to a user account of a same entity as the buyer computer that another user account of the same entity has marked the supplier payment account as fraudulent;
    configuring the e-procurement platform instance to block a submission of a new payment from the buyer computer to the supplier payment account.

19. The one or more non-transitory computer-readable storage media of claim 13, further comprising one or more sequences of stored program instructions which, when executed using the one or more processors, cause the one or more processors to execute:
- determining, by programmatically searching the result set, that one or more other payment accounts are specified in other records of the digital data repository for the supplier, and that one of the entities associated with the buyer computer has not associated any of the other payment accounts with the supplier;
- in response thereto, generating and causing displaying, in a graphical user interface on the buyer computer, a visual dialog box having a plurality of rows respectively identifying the one or more other payment accounts and comprising a plurality of hyperlinks respectively associated with the plurality of rows;
- each hyperlink in the plurality of hyperlinks being programmed, when selected, to associate one of the one or more other payment accounts with a virtual card.

20. The one or more non-transitory computer-readable storage media of claim 13, wherein the hash algorithm is a one-way SHA-256 hash, and the cryptographically secure fingerprint is created using the one-way SHA-256 hash over a country-specific concatenation of a plurality of elements of the supplier payment account data.

21. The one or more non-transitory computer-readable storage media of claim 20, the plurality of elements comprising a country value specifying United States of America, an ABA routing number and a bank account number.

22. The one or more non-transitory computer-readable storage media of claim 13, the records of the digital data repository being organized using a plurality of relational database tables comprising: a supplier references table being related indirectly to a payments account table; a payments table being related to the payment accounts table; the payments account table being related to a fingerprints table; the fingerprints table being related to a bank accounts table.

23. The one or more non-transitory computer-readable storage media of claim 22, the fingerprints table comprising columns that associate a fingerprint value, a randomly or pseudorandomly generated reference key, and a type of account from which the fingerprint value was created.

24. The one or more non-transitory computer-readable storage media of claim 23, further comprising one or more sequences of stored program instructions which, when executed using the one or more processors, cause the one or more processors to execute: in response to the querying, determining that the fingerprint value does not match a row in the fingerprints table, and in response: creating a new row in the fingerprints table, the new row having a row identifier; storing the row identifier in the payment accounts table in association with customer data identifying one of the entities that is associated with the buyer computer; and storing the fingerprint value in the new row of the fingerprints table.

* * * * *